US008934493B2

(12) United States Patent
Durve et al.

(10) Patent No.: US 8,934,493 B2
(45) Date of Patent: Jan. 13, 2015

(54) AGGREGATING COMMUNICATION CHANNELS

(75) Inventors: Rahul Durve, Cupertino, CA (US);
Rajesh Satapathy, Tustin, CA (US);
Chung-Jue Chen, Irvine, CA (US);
Tiruvur Arun, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 420 days.

(21) Appl. No.: 13/085,427

(22) Filed: Apr. 12, 2011

(65) Prior Publication Data

US 2012/0219005 A1  Aug. 30, 2012

Related U.S. Application Data

(60) Provisional application No. 61/446,494, filed on Feb. 24, 2011.

(51) Int. Cl.
*H04L 12/26* (2006.01)
*H04J 1/16* (2006.01)
*G08C 15/00* (2006.01)
*G06F 11/00* (2006.01)
*G01R 31/08* (2006.01)

(52) U.S. Cl.
USPC ............ 370/400; 370/236; 370/392; 709/251

(58) Field of Classification Search
USPC ........... 370/217–235, 386–401; 709/242–251
See application file for complete search history.

(56) References Cited

U.S. PATENT DOCUMENTS

| 7,433,971 | B2* | 10/2008 | Feuerstraeter et al. | 709/251 |
|---|---|---|---|---|
| 7,697,522 | B2* | 4/2010 | Kliger et al. | 370/389 |
| 7,720,068 | B2* | 5/2010 | McClellan | 370/391 |
| 7,778,162 | B2* | 8/2010 | Yu | 370/223 |
| 7,835,376 | B2* | 11/2010 | Tanaka | 370/401 |
| 7,835,405 | B2* | 11/2010 | Kaluskar | 370/512 |
| 8,089,965 | B2* | 1/2012 | Mitsumori | 370/390 |
| 8,098,572 | B2* | 1/2012 | Zhou et al. | 370/216 |
| 8,213,296 | B2* | 7/2012 | Shannon et al. | 370/216 |
| 8,243,594 | B1* | 8/2012 | Fotedar et al. | 370/229 |
| 8,307,265 | B2* | 11/2012 | Ganga et al. | 714/776 |
| 8,462,636 | B2* | 6/2013 | Simmons et al. | 370/236.1 |
| 8,605,726 | B2* | 12/2013 | Grosser et al. | 370/392 |
| 2002/0126709 | A1* | 9/2002 | Lauder et al. | 370/535 |
| 2003/0097480 | A1* | 5/2003 | Feuerstraeter et al. | 709/251 |
| 2003/0108063 | A1* | 6/2003 | Joseph et al. | 370/465 |
| 2007/0086450 | A1* | 4/2007 | Baumer et al. | 370/389 |
| 2007/0165663 | A1* | 7/2007 | Aloni et al. | 370/420 |
| 2007/0206618 | A1* | 9/2007 | Zelig et al. | 370/404 |
| 2010/0211664 | A1* | 8/2010 | Raza et al. | 709/223 |
| 2010/0316028 | A1* | 12/2010 | Allen et al. | 370/336 |
| 2010/0325271 | A1* | 12/2010 | Krzanowski et al. | 709/224 |

* cited by examiner

*Primary Examiner* — Man Phan
(74) *Attorney, Agent, or Firm* — Sterne, Kessler, Goldstein & Fox PLLC

(57) ABSTRACT

Techniques, systems and apparatus are described for implementing an inter-channel ring interface in a communication device. A communication device can include communication channels to carry data at respective first data throughputs. An inter-channel ring interface connects at least some of the communication channels in a ring configuration to form an aggregated group of channels that operates as a single channel at a second data throughput.

20 Claims, 16 Drawing Sheets

Inter-Channel Ring for 3x40G and 2x10G

AGGREGATING COMMUNICATION CHANNELS

CROSS REFERENCE TO RELATED APPLICATIONS

This patent application claims the benefit of U.S. Provisional Patent Application No. 61/446,494, filed Feb. 24, 2011, entitled "AGGREGATING COMMUNICATION CHANNELS." The entire content of the before-mentioned patent application is incorporated by reference as part of the disclosure of this application.

BACKGROUND

This application relates to devices, techniques and systems for communications, such as network communications systems.

Communications devices and systems interact and communicate with one another via communication links that connect various communication devices and based on communication protocols that govern communications of data and other information through the communication links. For example, under the Open System Interconnection (OSI) Model, a communications system is subdivided into different layers including: a physical layer (PHY), a data link layer, a network layer, a transport layer, a session layer, a presentation layer and an application layer. The PHY includes physical data channels (or lanes) that provide a data connection between the data link layer and a physical medium, such as optical fibers and copper cables. An aggregated lane physical layer (PHY) can be implemented by bundling together multiple lower bandwidth lanes or channels. For example, an IEEE 802.3 40 Gigabit Ethernet (GbE) PHY can be built by aggregating physically or logically together four 10 GbE PHY channels.

Under OSI, a dedicated Physical Medium Dependent (PMD) sub-layer is provided for Ethernet communications, including proper operation of the aggregated PHY channels or lanes. The PMD can be used to present the aggregated PHY channels as a single port on the management interface with a linear address space spanning different channels. The dedicated PMD sub-layer communicates, collects and meaningfully combines information from individual channels in the aggregation or bundle to operate the aggregated PHY channels as a single channel having higher throughput than each individual PHY channel.

BRIEF DESCRIPTION OF THE DRAWINGS

Like reference symbols and designations in the various drawings indicate like elements.

DETAILED DESCRIPTION

Figure 1:
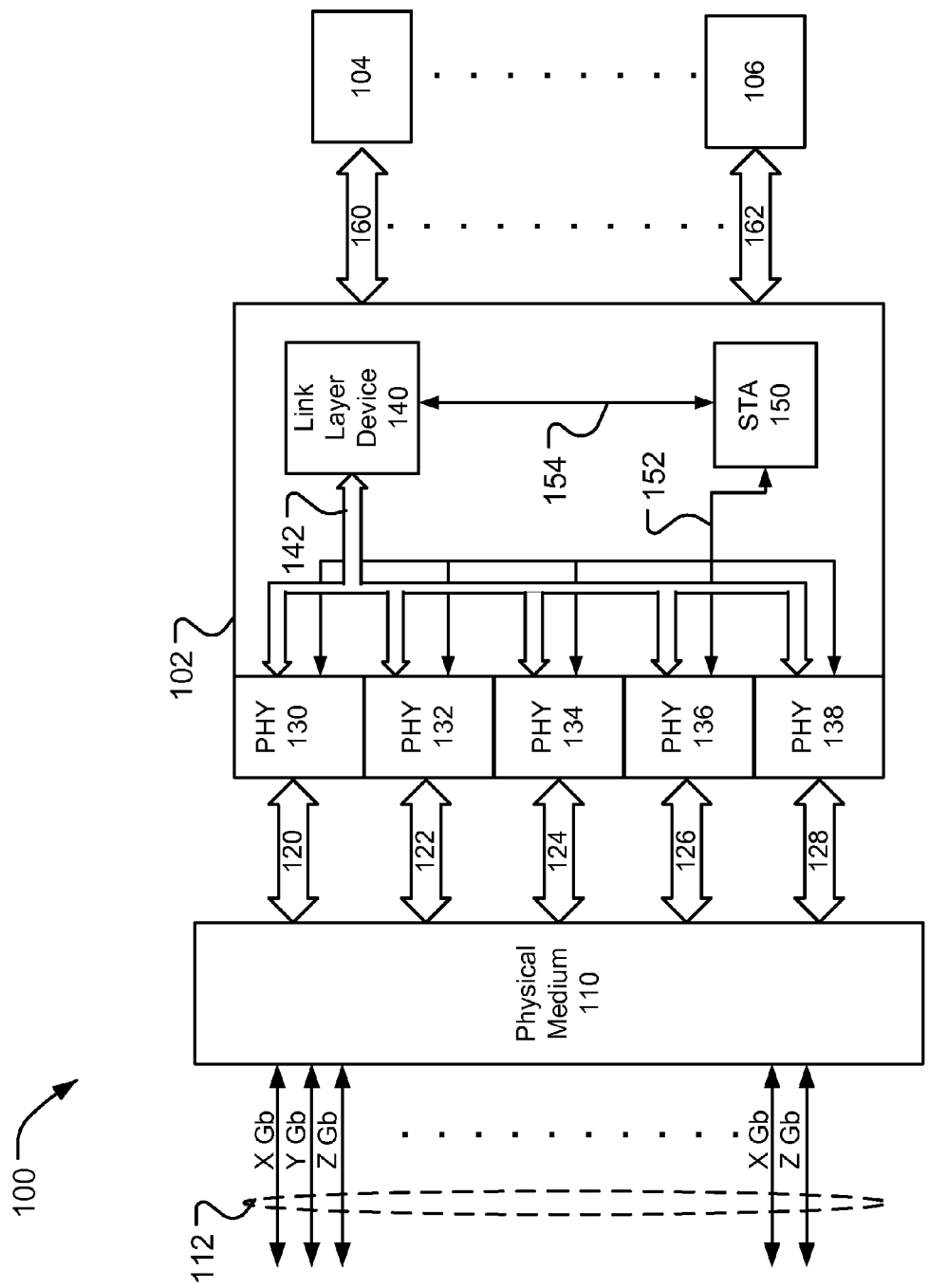
FIG. 1 is a block diagram of an exemplary system for establishing network communications.

Examples for implementing techniques, apparatus and systems are described based on a ring interface across multiple channels or lanes in a physical layer (PHY) device under the Open Systems Interconnection (OSI) Model. The ring interface across multiple channels or lanes can be used to provide a scalable aggregation of channels in a PHY device. In the described examples, functionalities of the PMD sub-layer are distributed to individual channels in a device by including global PHY registers in each channel. In some implementations, the functionalities of the PMD sub-layer can be either distributed among the individual channels without a centralized PMD component or based on a combination of distribution of some of the functionalities of the PMD sub-layer among the channels while having a centralized PMD module outside the individual channels for performing one or more centralized PMD functionalities. In addition, a ring interface can be implemented to connect multiple channels using a wire connection between channels to form an inter-channel ring for inter-channel communications and signaling that provide management and coordination of the distributed functionalities of the PMD sub-layer, including making all channels in the ring aware of a given channel configuration (e.g., data throughput of 10 GbE, 40 GbE, 100 GbE, etc.) as well as respective channel number assignments within the inter-channel ring. The combination of the global aggregate PHY registers and the ring interface can allow multiple channels to communicate with each other. The multiple channels can be located in a single chip where the inter-channel ring is formed within the single chip, across multiple chips where the inter-channel ring spans chips boundaries, or any combination thereof. In some implementations, two or more inter-channel rings can be formed to construct different aggregated PHY channels. The ring interface connected channels can collect and combine information associated with all channels in the ring, and the collected and combined information can be present to the correct address on the management interface, based on the channel configuration and assigned channel numbers.

This combination of distributed functionalities of the PMD sub-layer and the inter-channel ring for managing the channels within the ring and various implementations of this combination can be used to provide a scalable architecture for communication chip design, a versatile platform for adopting different communication channels at different speeds or throughput levels to meet various communication needs, and flexibility and scalability in deployment of communication devices, modules and systems that integrate both legacy, existing and new communication technologies. The examples provided below are for Ethernet communications as way of example and the hardware designs and techniques in these examples can be applied to communication devices, systems and techniques beyond Ethernet communications.

Network System

FIG. 1 is a block diagram of an exemplary communications system 100 that supports various communications protocols, such as Institute of Electrical and Electronic Engineers (IEEE) 802.3x Local Area Network (LAN) Ethernet protocols. A network device or appliance 102 can be configured to receive data through one or more physical connections 120, 122, 124, 126 and 128 (e.g., line side connections) to a physical medium 110 associated with one or more physical communication links 112 that are in communication with one or more other network devices, e.g., a network device in a remote location in a communications network. The network device or appliance 102 can be implemented for one or more of network applications including blade servers, network switches, hubs/repeaters, network test equipments, optical modules, optical and digital cross connects, multiple rate Synchronous Optical Networking (SONET) and Synchronous Digital Hierarchy (SDH) transmitters, network interface cards (NICs), Asynchronous Transfer Mode (ATM) switch backbones, etc. As illustrated, connections 160 and 162 are provided on the other side of the network device 102 to communicate with one or more network modules 104 and 106, e.g., network switches or terminals. By way of example, large datacenters can implement combinations of the above network devices 102 to provide multiple network nodes or terminals with access to various data sources residing on a network.

The physical medium 110 can include optical fiber and/or copper wire connections 112 at various data throughput, such as 10 GbE, 40 GbE, 100 GbE, etc. The optical fiber connections can support various standards including 10GBASE-SR ('short range'), 10GBASE-LR ('long range'), 10GBASE-LRM ('long range multimode'), 10GBASE-ER ('extended reach'), 10GBASE-ZR (extended reach pluggable interface with a longer range), 10GBASE-LX4 ('extra long range'), etc. The copper wire connections can include various twin-ax cabling, twisted pair cabling, and backplanes. For example, the copper cable standards can include 10GBASE-CX4, SFP+Direct Attach (also known as 10GSFP+Cu or 10GBASE-CR), Backplane (including 10GBASE-KX4, 10GBASE-KR, 1000BASE-KX, 40GBASE-KR4, etc.), and 10GBASE-T standards.

The network device 102 includes one or more physical layer devices (PHYs) 130, 132, 134, 136 and 138 that connect one or more link layer devices 140 to the physical medium 110 using physical connections 120, 122, 124, 126 and 128. The link layer device 140 can be implemented as a Media Access Control (MAC) data communication protocol sub-layer device that provides addressing and channel access control mechanisms for allowing multiple network nodes or terminals to communicate within a multi-point network, such as a LAN. For example, the MAC device 140 can provide one or more connections, e.g., connections 160 and 162, to one or more network nodes, e.g. terminals 104 and 106. The PHY devices 130, 132, 134, 136 and 138 can be connected to the one or more link layer devices 140 using a bi-directional interface or interconnect 142. An example of the bi-directional interface or interconnect 142 can include a high-speed parallel interface, such as a Gigabit Media Independent Interface (GMII).

A station manager device 150 can manage the operation of the link layer device 140 and the PHY devices 130, 132, 134, 136 and 138. For example, the station manager device 150 can read from/write to registers of the link layer device 140 and the PHY devices 130, 132, 134, 136 and 138 to dynamically control the functional operations of the link layer device 140 and the PHY devices 130, 132, 134, 136 and 138. The station manager 150 can control the link layer device 140 and the PHY devices 130, 132, 134, 136 and 138 to set the channel configuration or operational mode (e.g., data throughput) of the network device 102. The station manager 150 can communicate with the PHY devices 130, 132, 134, 136 and 138 through a bi-directional interface or interconnect 152 to perform the management operations. Similarly, the station manage 150 can communicate with the link layer device 140 through an interface or interconnect 154 to perform management operations on the link layer device 140. The interface 154 can be implemented as, for example, a Management Data Input/Output (MDIO) interface.

PHY Layer Architecture

Figure 2:
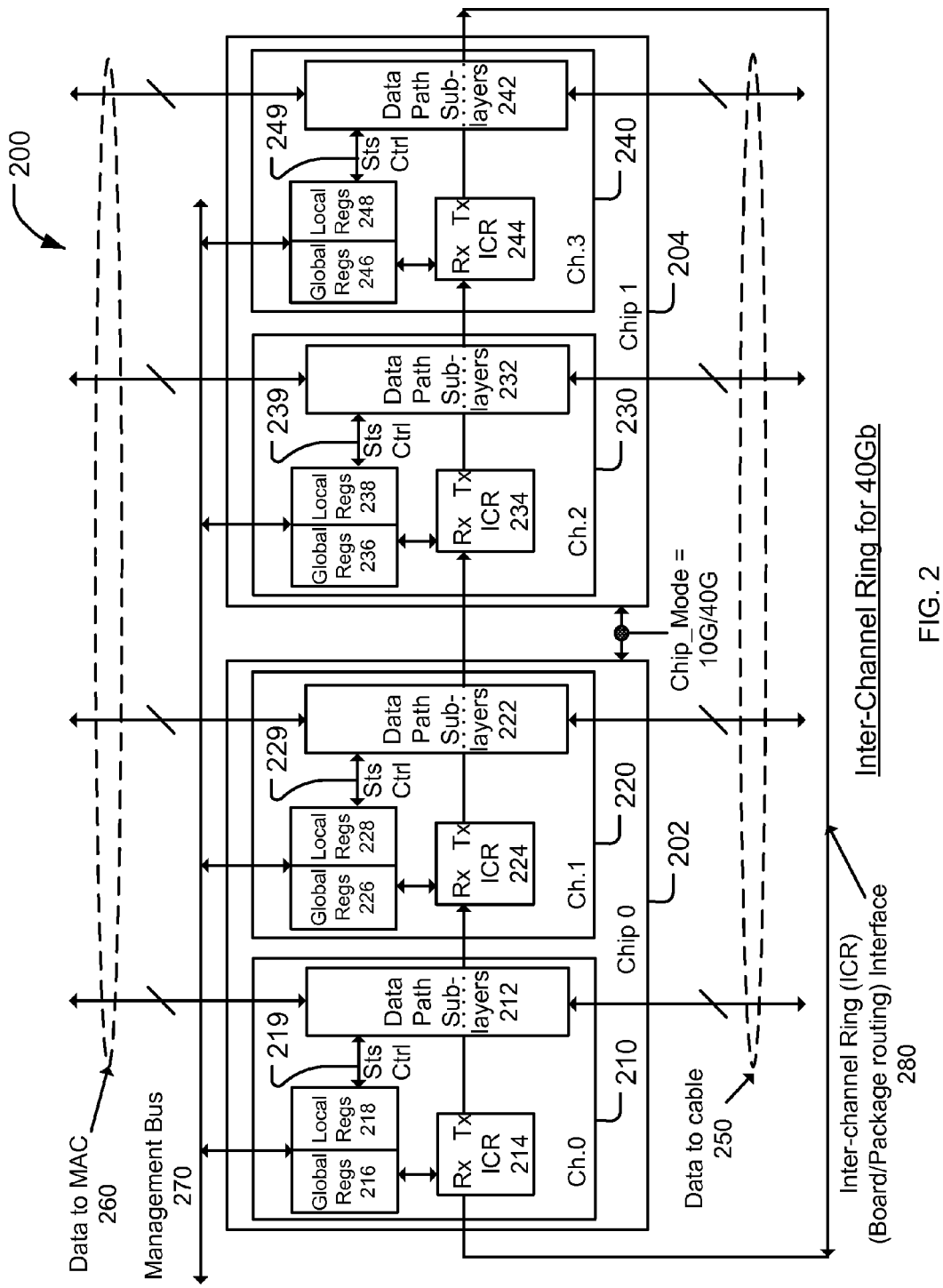
FIG. 2 is a block diagram of an exemplary PHY device implementing an inter-channel ring interface to allow channel aggregation across chip boundaries.

FIG. 2 is a block diagram of an exemplary PHY device 200 implementing an inter-channel ring interface to allow channel aggregation across chip boundaries. The PHY device 200 can be used to implement any of the PHY devices 130, 132, 134, 136 and 138 described with respect to FIG. 1. The example shown in FIG. 2 is a quad-10 Gb channel die implemented using two chips (Chip 0 and Chip 1) 202 and 204, with each chip including dual PHY channels. Each channel (or communication channel) is connected by data communication links connecting each channel between one or more line-side modules 250 and one or more network-side modules 260, and control/management communication links via management bus 270 and inter-channel ring interface 280. The management bus is directly connected to each channel on the chip die to communicate directly with each channel. For example, the management bus can be used to read/write directly into the registers in each channel.

For example, Chip 0 (202) includes channels 210 and 220, and Chip 1 (204) includes channels 230 and 240. The four channels 210, 220, 230 and 240 can operate independently as separate 10 Gb channels. In addition, the four channels can be grouped (or aggregated) to operate as a single 40 Gb channel. In other implementations, either or both of the chips can be implemented to include a different number channels, such as four channels. The throughput for one channel need not be the same as other channels on the die. For example, the channels in Chip 0 may include 2 10 Gb channels or one 10 Gb channel and one 40 Gb channel. In addition, the channels in Chip 1 may include channels of different throughputs. Also, the multiple channels included in the multiple chips can be selectively grouped (or aggregated) to implement different sized channels. For instance, channels can be grouped, either within a single chip or across multiple chips, to form multiple 10 Gb channels, multiple 40 Gb channels, multiple 100 Gb channels, etc., or any combination thereof.

In some implementations, different PHY channels, whether in the same chip or in different chips, can be configured to have an identical or similar structure. Using a unified structure for all channels can simplify the chip design, allow the same chip design to be used in versatile configurations based on a combination of distributed functionalities of the PMD sub-layer and the inter-channel ring for managing the channels within the ring, and provide scalable hardware platforms for using different communication channels at different speeds or throughput levels to meet various communication needs. For example, any one of the channels can be assigned to operate as the primary channel ('channel 0') for the inter-channel ring communication that initiates auto-negotiation, channel reboot, reset, channel configuration, and other operations in managing the channels in the ring. Thus, while channel 210 is labeled as 'channel 0,' any channel can in fact operate as 'channel 0.' In some other implementations, channels can differ structurally and one or more channels having the appropriate structure can be designated as configurable to serve as 'channel 0.'

For example, channel 0 (210) in chip 0 (202) includes data path sub-layers 212 that receive data from a physical medium 250 which corresponds to the physical medium 110 in FIG. 1, such as copper cable or a backplane. Also, the data path sub-layers 212 transmit the received data to a link layer device 260 which corresponds to the link layer device 140 in FIG. 1, such as a MAC device. The operation of the data path sub-layers 212 depends on the channel configuration or operation mode (e.g., data throughput) designated or controlled by the station manager (e.g., station manager 150) through a management bus 270.

To provide communication with other channels, channel 210 includes an inter-channel ring transceiver 214 that includes a receiver (Rx) and a transmitter (Tx). Using an inter-channel ring interface 280, a bundle of channels is formed by physically connecting the receiver of a given channel to a transmitter of a neighboring channel, and physically connecting the transmitter of the given channel to a receiver of the neighboring channel. The transmitter of the last channel in the bundle is connected back to the receiver of the first channel to form the ring interface 280. The Rx-to-Tx connections across multiple channels can be repeated until a desired number of channels are connected using the inter-channel ring interface 280.

The inter-channel ring transceiver (e.g., 214 in channel 210) in each channel can be implemented as a universal asynchronous receiver/transmitter (UART)-type interface that includes an Rx (receive) pin and a Tx (transmit) pin. As shown in FIG. 2, the inter-channel ring interface 280 includes a single physical connection between channels to communicate control and status information. The communication within the inter-channel ring interface 280 can be synchronized with a system clock to avoid having to supply the source clock on a separate pin. In some implementations, the inter-channel ring interface 280 can be implemented to include an additional connection, so that the source clock is supplied on a separate pin.

Each channel includes one or more global registers for storing data or information related to aggregation of the channels in the ring 280 and one or more local registers for storing data or information related to the respective individual channel. To facilitate communications across all channels connected by the inter-channel ring interface 280, global registers 216 in channel 0 (210), for example, is provided to store status and control information for all channels. The global registers 216, 226, 236, and 246 can include MDIO registers. When the inter-channel ring interface 280 is active, the inter-channel ring transceiver of a channel, e.g. transceiver 214 of channel 0 (210), is in communication with the global registers, e.g. global registers 216, to perform read/write operations as needed for ring initiation and operation. Thus, the global registers, e.g. global registers 216, can include information used to group (or aggregate) multiple channels to operate as a single channel having a data throughput higher than an individual channel. For the example shown in FIG. 2, the global registers 216 in channel 0 (210) include status and control information for coordinating the four channels 210, 220, 230 and 240 to operate as a single 40 Gb channel.

When the inter-channel ring interface 280 is not active, each channel operates as an individual 10 Gb channel by accessing status and control information stored in the local registers, e.g. the local registers 218 of channel 0 (210). The local registers can include MDIO registers. Because operation of a channel, e.g. channel 210, as an individual 10 Gb channel is not dependent on communications with neighboring channels, the local registers corresponding to the channel, e.g. local registers 218, can include information pertaining only to that channel.

The operation of the channels 210, 220, 230 and 240 as individual 10 Gb channels or as an aggregated 40 Gb channel can be based on instructions received from the station manager (e.g., station manager 150) through the management bus 270. In addition, the management bus 270 can be used to provide instructions on channel assignments, including the identification of 'channel 0' in a particular ring bundle. The data path sub-layers, e.g. data path sub-layer 212 of channel 0 (210), operate either as an independent 10 Gb channel or as part of an aggregated 40 Gb channel by using the control and status information obtained from the corresponding registers, e.g. the local registers 218 or the global registers 216 of channel 0 (210), through an interface 219.

The structure described above with respect to channel 0 (210) can be identical for all channels in the PHY device 200. Specifically, channel 1 (220) in chip 202 includes data path sub-layers 222 that receive data from the physical medium 250, such as optical fiber, copper cable or backplane. The data path sub-layers 222 also transmit data to the link layer device 260, such as a MAC device. The data throughput through the data path sub-layers 222 is based on instructions received from the station manager through the management bus 270.

For forming a bundle (or aggregation) of channels, channel 1 (220) includes an inter-channel ring transceiver 224 having a receive (Rx) pin and a transmit (Tx) pin. The inter-channel ring transceiver 224 connects to global registers 226 that store updated status and control information for all channels in the bundle. When the inter-channel ring transceiver 280 is not active, the control and status information stored in local registers 226 is used to operate channel 1 (220) as an independent 10 Gb channel. An interface 229 is provided to allow the data path sub-layers 222 to access the status and control information stored in the global registers 226 and the local registers 228.

Channel 230 (e.g., channel 2) in chip 204 includes data path sub-layers 232 that receive data from the physical medium 250, such as optical fiber, copper cable or backplane. The data path sub-layers 232 also transmit data to the link layer device 260, such as a MAC device. The data throughput through the data path sub-layers 232 is based on instructions received from the station manager through the management bus 270.

For forming a bundle (or aggregation) of channels, the channel 230 includes an inter-channel ring transceiver 234 having a receive (Rx) pin and a transmit (Tx) pin. The inter-channel ring transceiver 234 connects to global registers 236 that store updated status and control information for all channels in the bundle. When the inter-channel ring transceiver 280 is not active, the control and status information stored in local registers 236 is used to operate channel 230 as an independent 10 Gb channel. An interface 239 is provided to allow the data path sub-layers 232 to access the status and control information stored in the global registers 236 and the local registers 238.

Channel 240 (e.g., channel 3) in chip 204 includes data path sub-layers 242 that receive data from the physical medium 250, such as optical fiber, copper cable or backplane. The data path sub-layers 242 also transmit data to the link layer device 260, such as a MAC device. The data throughput through the data path sub-layers 242 is based on instructions received from the station manager through the management bus 270.

For forming a bundle (or aggregation) of channels, the channel 240 includes an inter-channel ring transceiver 244 having a receive (Rx) pin and a transmit (Tx) pin. The inter-channel ring transceiver 244 connects to global registers 246 that store updated status and control information for all channels in the bundle. When the inter-channel ring transceiver 280 is not active, the control and status information stored in local registers 246 is used to operate channel 220 as an independent 10 Gb channel. An interface 249 is provided to allow the data path sub-layers 242 to access the status and control information stored in the global registers 246 and the local registers 248.

In the example if FIG. 2, the PHY device 200 can be implemented to operate as four independent channels of lower data throughput (e.g., 10 Gb.) The PHY device 200 includes the inter-channel ring interface 280 that physically connects the four channels to form a ring. Specifically, the Tx pin of channel 210 is connected to the Rx pin of channel 220, the Tx pin of channel 220 is connected to the Rx pin of channel 230, the Tx pin of channel 230 is connected to the Rx pin of channel 240, and the Tx pin of channel 240 is connected back to the Rx pin of channel 210 to complete the ring. Other ring configurations also can be implemented through different physical connections. For example, within the chip 202, an in-chip ring can be formed to connect channels 212 and 222 to form a two-channel ring that aggregates the two channels 212 and 222 into a single channel. Further, the inter-channel ring interface 280 can be formed across chip boundaries as shown in FIG. 2. When the inter-channel ring is active, the PHY device 200 can implement a single channel that has higher data throughput than the individual channels. In the example shown in FIG. 2, the combined channels can operate as a 40 Gb channel (e.g., 10 Gb×4 channels.)

Figure 3A:
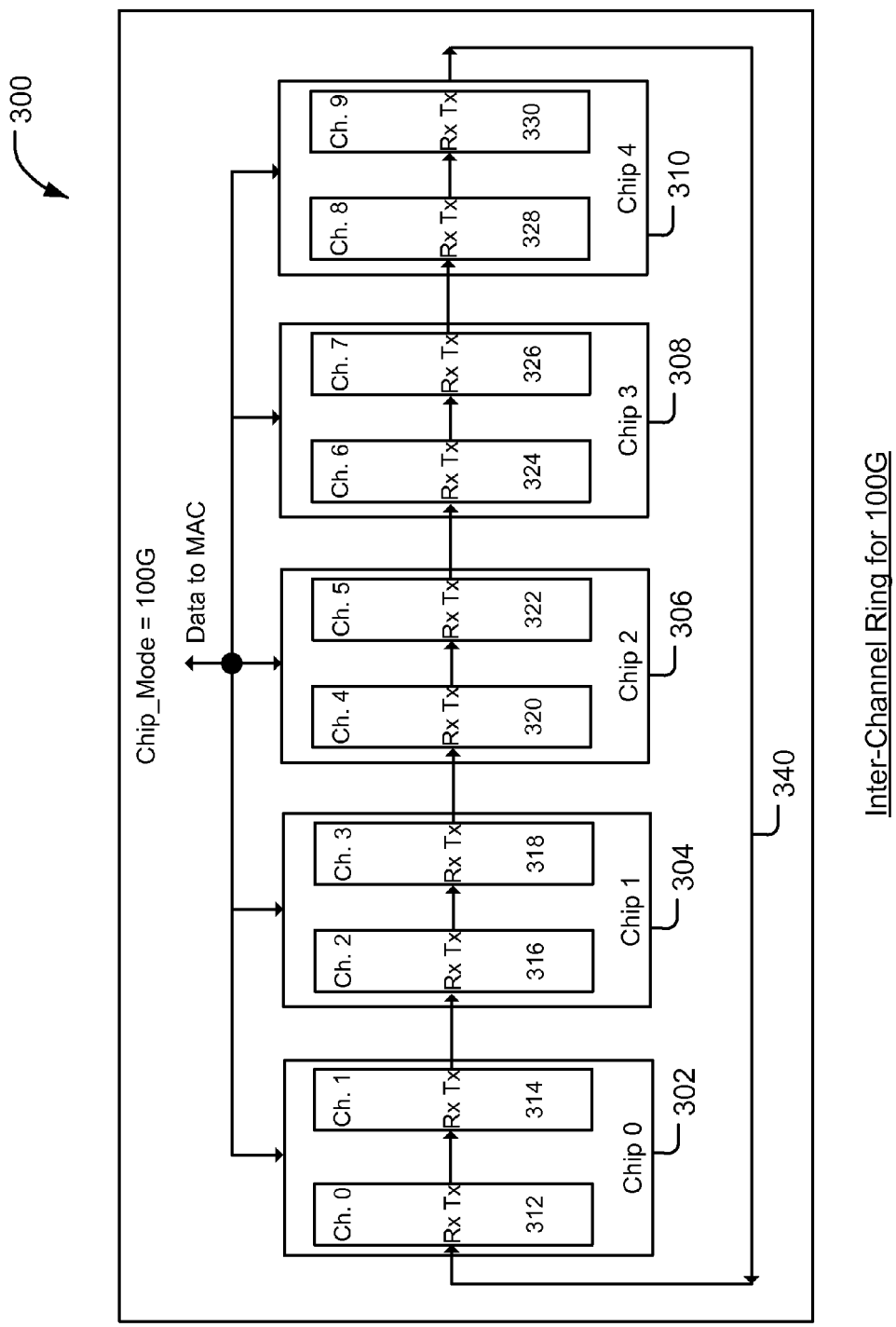
FIG. 3A is a block diagram of an exemplary PHY device configurable as individual 10 Gb channels or a combined 100 Gb channel.

Different configurations having different data throughput (e.g., other than 40 Gb described above) can be achieved by connecting together different number of channels, either within a single chip or across chip boundaries. For example, FIG. 3A shows a block diagram of an exemplary PHY device 300 configurable as individual 10 Gb channels or as a combined 100 Gb channel. Each channel in FIG. 3A can be implemented to be substantially identical to channels described with respect to FIG. 2, e.g. channels 210, 220, 230 and 240. Therefore, details of each channel are not provided with respect to FIG. 3A, which illustrates the ability to connect ten channels across chip boundaries to form a single, aggregated 100 Gb channel.

The PHY device 300 in FIG. 3A includes five chips 302, 304, 306, 308 and 310, with each chip including two channels. For example, chip 302 includes channels 312 and 314. Chip 304 includes channels 316 and 318. Chip 306 includes channels 320 and 322. Chip 308 includes channels 324 and 326. Chip 310 includes channels 328 and 330. An inter-channel ring interface 340 connects the ten channels to form a ring by connecting a Tx pin of channel 312 to an Rx pin of channel 314, a Tx pin of channel 314 to an Rx pin of channel 316, a Tx pin of channel 316 with an Rx pin of channel 318, a Tx pin of channel 318 to an Rx pin of channel 320, a Tx pin of channel 320 to an Rx pin of channel 322, a Tx pin of channel 322 to an Rx pin of channel 324, a Tx pin of channel 324 to an Rx pin of channel 326, a Tx pin of channel 326 to an Rx pin of channel 328, a Tx pin of channel 328 to an Rx pin of channel 330, and a Tx pin of channel 330 back to an Rx pin of channel 312 to complete the ring. The connections are made both within a chip, e.g. the connection between the Tx pin of channel 312 and the Rx pin of channel 314, and across chip boundaries, e.g. the connection between the Tx pin of channel 314 and the Rx pin of channel 316.

Figure 3B:
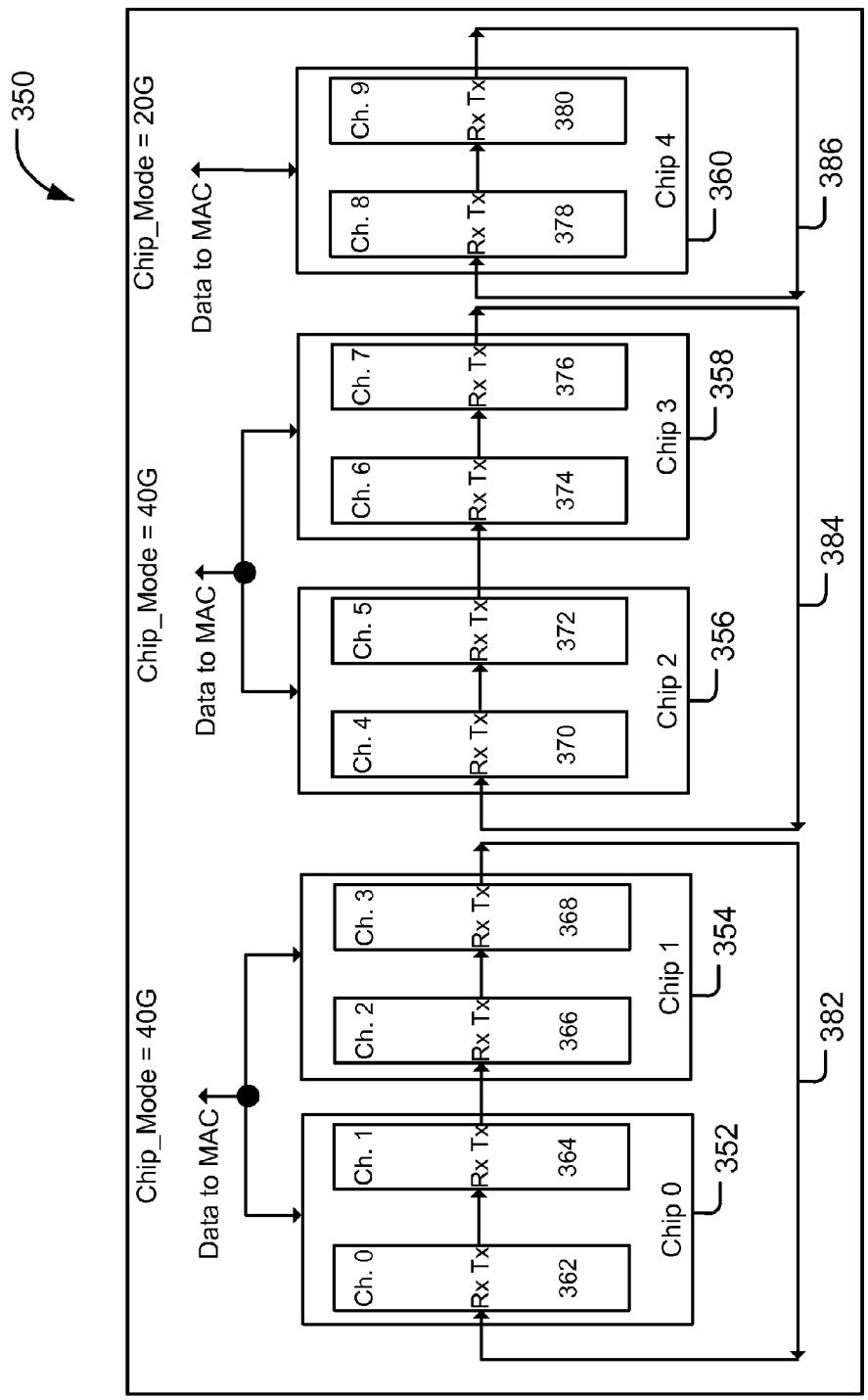
FIG. 3B is a block diagram of an exemplary PHY device configurable as individual 10 Gb channels or as two 40 Gb channels and a single 20 Gb channel.

FIG. 3B shows a block diagram of an exemplary PHY device 350 configurable as ten individual 10 Gb channels or as two 40 Gb channels and a single 20 Gb channel. Each channel in FIG. 3B can be implemented to be substantially identical to channels 210, 220, 230 and 240 described with respect to FIG. 2. FIG. 3B illustrates the ability to connect ten channels across chip boundaries to form two 40 Gb channels based on two inter-chip rings 382 and 384 across chip boundaries and a single 20 Gb channel using an intra-chip channel ring interface 386 within the same chip.

Similar to the PHY device 300, the PHY device 350 in FIG. 3B includes five chips 352, 354, 356, 358 and 360, with each chip including two channels. For example, chip 352 includes channels 362 and 364. Chip 354 includes channels 366 and 368. Chip 356 includes channels 370 and 372. Chip 358 includes channels 374 and 376. Chip 360 includes channels 378 and 380. An inter-channel ring interface 382 connects the first four channels 362, 364, 366 and 368 across chips 352 and 354 to form a ring. The inter-channel ring interface 382 is formed by connecting a Tx pin of channel 362 to an Rx pin of channel 364, a Tx pin of channel 364 to an Rx pin of channel 366, a Tx pin of channel 366 to an Rx pin of channel 368, and a Tx pin of channel 368 back to an Rx pin of channel 362 to complete the ring. Thus, inter-channel ring interface 382 permits channels 362, 364, 366 and 368 to operate as a single 40 Gb channel.

Also, the PHY device 350 includes a second inter-channel ring 384 that connects channels 370, 372, 374 and 376 to form a second 40 Gb channel. Specifically, the inter-channel ring interface 384 connects a Tx pin of channel 370 to an Rx pin of channel 372, a Tx pin of channel 372 to an Rx pin of channel 374, a Tx pin of channel 374 to an Rx pin of channel 376, and a Tx pin of channel 376 back to an Rx pin of channel 370 to complete the inter-channel ring 384.

Further, the PHY device 350 can include a third inter-channel ring interface 386 to connect the remaining two channels 378 and 380 together to operate as a single 20 Gb channel. For example, the inter-channel ring interface 386 can connect a Tx pin of channel 378 to an Rx pin of channel 380 and can connect a Tx pin of channel 380 back to an Rx pin of channel 378 to complete the ring. Rather than combining the remaining two channels as a 20 Gb channel, another 40 Gb or 100 Gb ring interface can be implemented by combining channels 378 and 380 with an additional channels from one or more additional chips.

In some implementations, a particular inter-channel ring interface, either within the same chip or across chip boundaries of two or more chips, can be provided for a particular aggregation of channels connected in the ring interface. One or more additional different inter-channel ring interfaces can be formed in the same device to provide additional different configurations of aggregation of channels in the device.

Figure 4A:
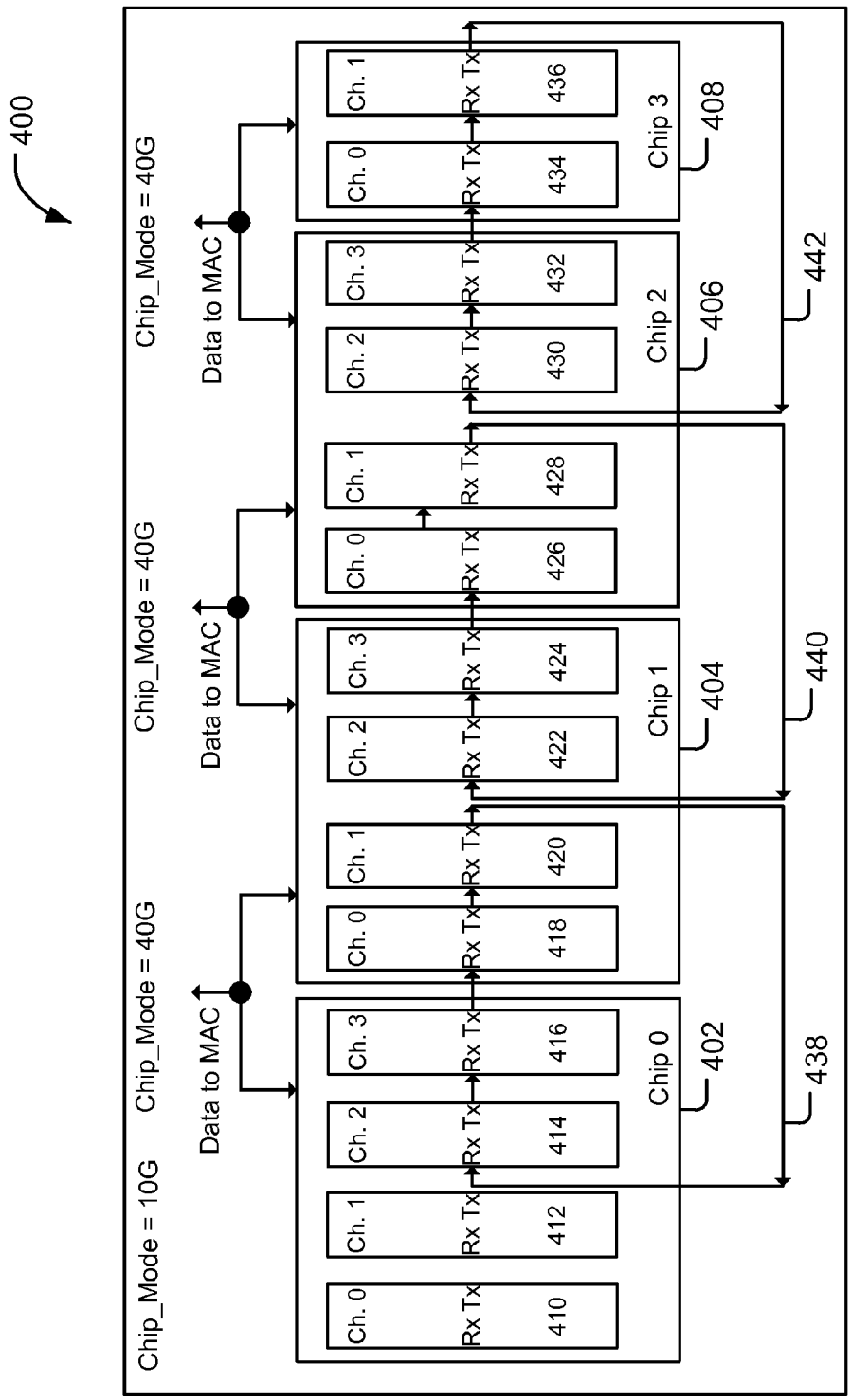
FIG. 4A shows a block diagram of an exemplary PHY device that includes multiple quad-channel chips configurable as individual channels or aggregated groups of channels.

In addition, each chip die can include different number of channels. For example, FIG. 4A shows a block diagram of an exemplary PHY device 400 that includes multiple quad-channel chips configurable as individual channels or aggregated groups of channels. The PHY device 400 shows a number of variations possible. For example, different chips in a die can include different number of channels. Of the four chips 402, 404, 406 and 408 included in the PHY device 400, chips 402, 404 and 406 are quad-channel chips and chip 408 is a dual-channel chip. The channels in chips 402, 404 and 406 can be aggregated to provide three 40 Gb channels.

In addition, only some of the channels in a chip can be aggregated using an inter-channel ring interface. Chip 402 includes four channels 410, 412, 414 and 416. Of the four channels 410, 412, 414 and 416, only channels 414 and 416 are included in an inter-channel ring interface 438. Channels 414 and 416 are physically connected to channels 418 and 420 from a different chip (e.g., chip 404) in a ring configuration to form an aggregated group of channels that operates as a single channel configured for 40 Gb throughput.

FIG. 4A also shows that channels within a given chip can be used to form more than one inter-channel ring interfaces. As described above, the inter-channel ring interface 438 physically connects channels 418 and 420 from chip 404 to channels 414 and 416 from chip 402 in a ring configuration to form an aggregated group of channels that operate as a single channel configured for 40 Gb throughput. The remaining two channels 422 and 424 of chip 404 are aggregated with channels 426 and 428 from chip 406 using a second inter-channel ring interface 440.

Similarly, the four channels 426, 428, 430 and 432 of chip 406 are included in two different inter-channel ring interfaces 440 and 442. For example, the inter-channel ring interface 440 physically connects channels 422 and 424 from chip 404 to channels 426 and 428 from chip 406 in a ring configuration to form an aggregated group of channels that operate as a single 40 Gb channel. Also, the inter-channel ring interface 442 physically connects the remaining channels 430 and 432 of chip 406 to channels 434 and 436 from a different chip 408 in a ring configuration to form another aggregated group of channels that operate as a single channel configured for 40 Gb throughput.

Figure 4B:
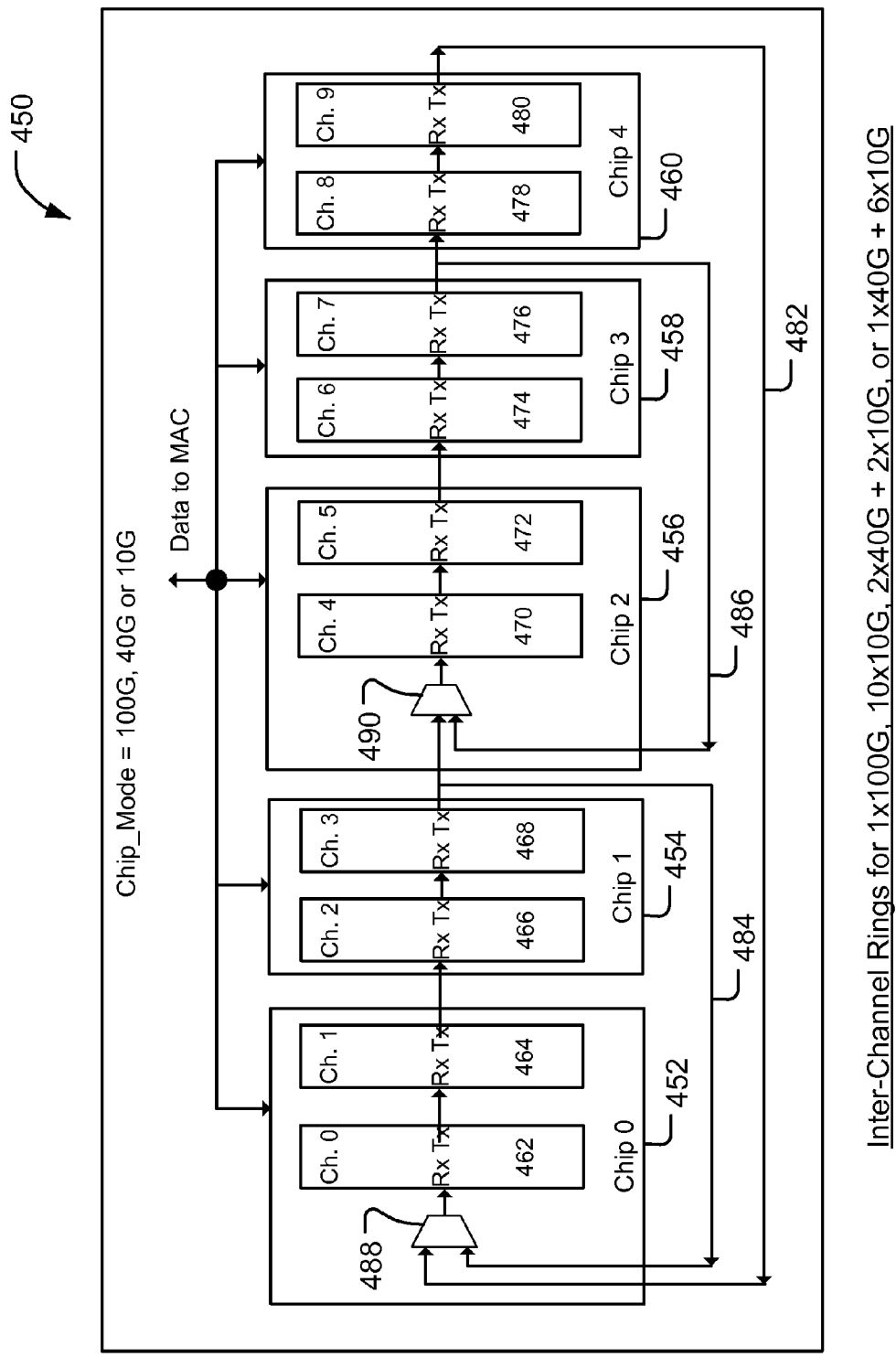
FIG. 4B is a block diagram showing an exemplary PHY device that includes five dual-channel chips.

In some implementations, channels can be connected to more than one inter-channel ring interfaces. FIG. 4B is a block diagram showing an exemplary PHY device 450 that includes five dual-channel chips 452, 454, 456, 458 and 460. Chip 452 includes channels 462 and 464. Chip 454 includes channels 466 and 468. The third chip 456 includes channels 470 and 472. The fourth chip 458 includes channels 470 and 472. The fifth chip 460 includes channels 474 and 476. Each of these channels 462, 464, 466, 468, 470, 472, 470, 472, 474 and 476 can be configured to support a respective data throughput. All channels can be configured for the same throughput (e.g., 10 Gb each), for example. In some implementations, different channels can support different data throughputs. For example, based on available inter-channel ring interface pins shown for the chips in FIG. 4B, the channels can be configured to support: one aggregated 100 G channel, 10 individual 10 G channels, two aggregated 40 G channels and two individual 10 G channel, or one aggregated 40 G channel and 6 individual 10 G channels.

In the example shown in FIG. 4B, the same channel can contribute to more than one inter-channel ring interfaces. For example, an inter-channel ring interface 482 can physically connect all ten channels 462, 464, 466, 468, 470, 472, 470, 472, 474 and 476 in a ring configuration to form an aggregated group of channels that operate at 100 Gb throughput. Also, some of the same channels aggregated by the inter-channel ring interface 482 can be aggregated by additional inter-channel ring interfaces. Channels 462, 464, 466 and 468 from chips can be connected together in a ring configuration using an inter-channel ring interface 484 to form an aggregated group of channels that operate as a single 40 Gb channel. Thus, channels 462, 464, 468 and 470 can be aggregated by the inter-channel ring interface 482 or the inter-channel ring interface 484. Moreover, the same channels 462, 464, 468 and 470 can be operated as individual channels.

Similarly, channels 470, 472, 474 and 476 from chips 456 and 458 can be connected together using an inter-channel ring interface 486 to form an aggregated group of channels that operate as a single channel configured for 40 Gb throughput. Thus, channels 470, 472, 474 and 476 from chips 456 and 458 also can contribute to two different inter-channel ring interfaces 482 and 486.

To facilitate multiple inter-channel ring interface connections for the channels, additional pin connections can be provided in the chip using multiplexers 488 and 490 for example. The multiplexer 488 in chip 452 allows channels 462 and 464 to be aggregated using the inter-channel ring interface 482 or the inter-channel ring interface 484. FIG. 4B shows chip 456 with the multiplexer 490 to allow channels 470 and 472 to be aggregated using inter-channel ring interfaces 482 and/or 486.

By allowing multiple inter-channel ring interfaces to aggregate the same channels, the throughput capabilities of a PHY device can be increased. Also, the same channels can be scaled to support multiple data throughputs.

Signaling Protocol

Figure 5:
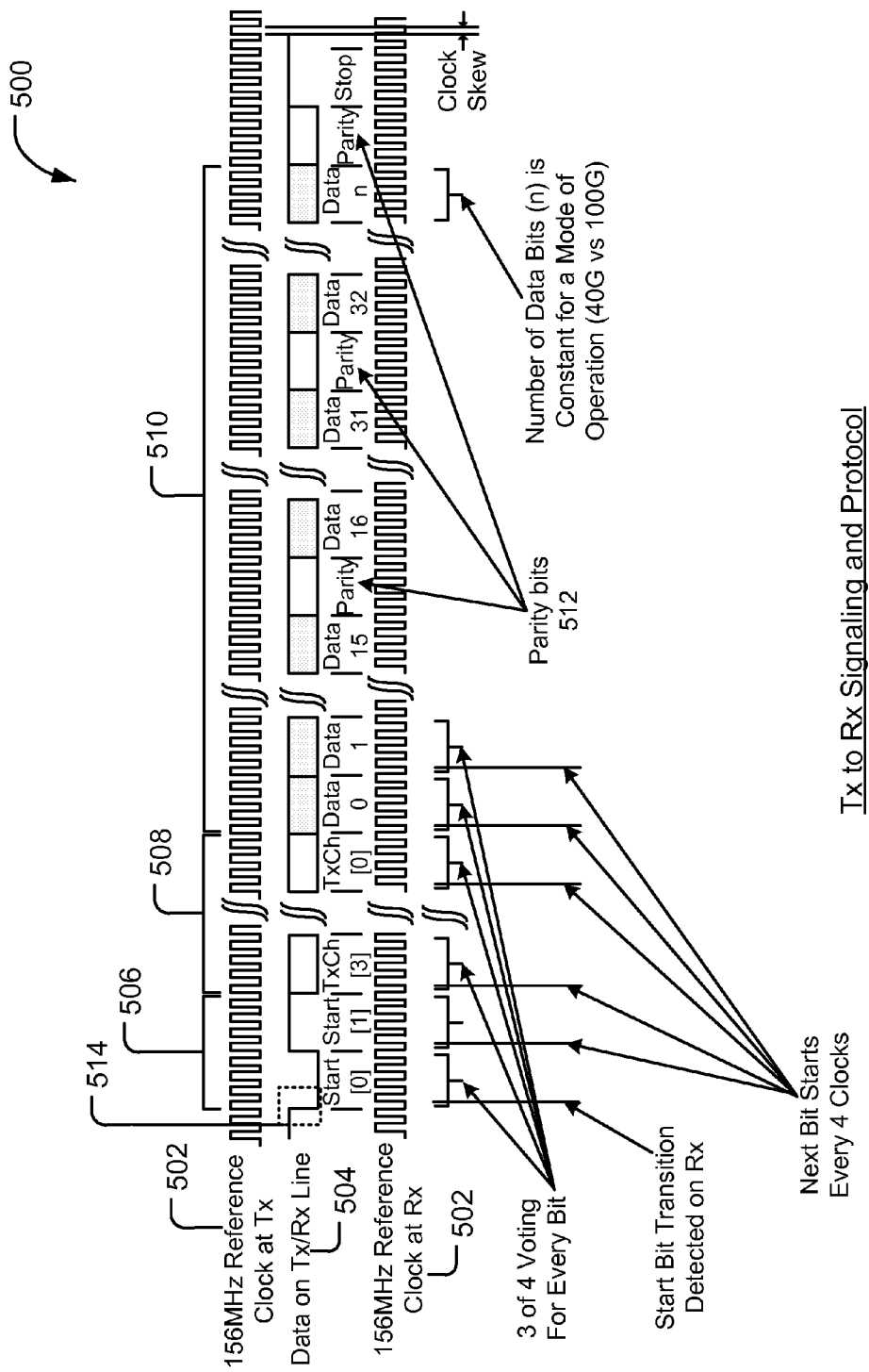
FIG. 5 is a block diagram showing an exemplary control/status signal frame timing diagram for implementing an inter-channel ring interface.

With the above described physical connections associated with one or more inter-channel ring interface set in place on a PHY device, control and status signaling can be implemented to activate the inter-channel ring interface. FIG. 5 is a block diagram showing an exemplary control/status signal frame timing diagram 500 for implementing an inter-channel ring interface. All channels connected by an inter-channel ring interface (e.g., inter-channel ring interface 280, 340, 440, 450 and/or 460) receive a reference clock signal 502 of the same frequency, which may or may not be phase aligned. In the timing diagram 500, the reference clock signal 502 at a Tx pin of a given channel is shown, for example, as a 156 MHz clock signal. The same reference clock signal 502 is shown at an Rx pin of the next or neighboring channel connected by the inter-channel ring interface. As described above, the clock signal 502 can be obtained from a system clock to be received by the Rx and Tx pins of all channels.

In between the two representations of the clock signal 502, an exemplary control and status information signal 504 that circulates over the inter-channel ring (via the Rx-to-Tx connections across the included channels) is shown to include 'n' number of data bits. The mode of operation (e.g., 40 Gb, 100 Gb, etc.) determines the number of data bits (n) to circulate over the inter-channel ring interface. Once the mode of operation is fixed and the inter-channel ring interface is configured, 'n' is set and remains constant to indicate the frame length of the control/status signal frame that circulates over the inter-channel ring interface. The bit length 'n' can be a multiple of a number of bits associated with each channel, such as 16 bits. As described below, the control/status signal frame includes start bits, channel number (of the channel that transmitted the control/status signal frame), a string of 'n' data bits, parity bits, and a stop bit.

The example in FIG. 5 shows the transfer of one control/status signal frame of the control/status signal frame 504 from the Tx pin of the given channel to the Rx pin of the next (or neighboring) channel in the inter-channel ring interface. When idling, each channel holds its Tx pin high. To start a control/status signal frame, the given channel transmits the start bits 506 followed by the channel number 508 of the transmitting channel. For the example shown in FIG. 5, the start bits can include a '0' for one bit time (e.g., 4 cycles of the reference clock), followed by a '1' for one bit time. However, different start bits can be used, for example, by having each channel hold its Tx pin low when idling. In that example, the start bits can include a '1' held for one bit time followed by a '0' held for one bit time. Moreover, different combinations of bits can be implemented as the start bits to indicate a start of the control/status signal frame.

The channel number 508 can be represented, for example, using a 4-bit binary number. In one implementation, Channel 0 can be represented as '0000,' channel 1 can be represented as '0001,' channel 2 can be represented as '0010,' channel 3 can be represented as '0011,' channel 4 can be represented as '0100,' channel 5 can be represented as '0101,' channel 6 can be represented as '0110,' channel 7 can be represented as '0111,' channel 8 can be represented as '1000,' channel 9 can be represented as '1001,' and channel 10 can be represented as '1010.' Other implementations can use other representations.

The use of predetermined start bits 506 and a channel number 508 can ensure reliable detection of a 'start condition' that indicates a 'start' of the control/status signal frame. The two start bits 506 along with the channel number 508 represent the start condition. The channel number 508 in the control/status signal frame 504 is followed by n data bits 510, with a parity bit 512 inserted after every n data bits. Thus, a receiving channel counts the number of bits received and expects a parity bit after every n data bits. A set of 16 data bits plus the associated parity bit can represent a 'cell' within the control/status signal frame. A stop bit (e.g., an Rx pin held high for one bit time) indicates the end of the control/status signal frame.

The parity bit 512 can serve various purposes. For example, as shown in FIG. 5, the parity bit 512 can provide odd parity protection for the n data bits in the cell. The odd parity protection shown in FIG. 5 can guarantee a parity bit of '1' a precise number of bits (e.g., 16 bits) after the start bits 506 at the Tx of channel-0, for example. Similarly, even parity protection can be implemented. Also, the parity bit 512 can provide an indication of one or more errors encountered by the preceding channel in the previous n data bits. The transmitting channel sends at least an incorrect parity bit for such indication.

Each bit of the control/status signal frame is held for one bit time (e.g., four clock cycles) before the next bit is transmitted. The bit time can vary depending on the reference clock frequency, but is set long enough to ensure correct bit capture at an Rx pin. At the end of the control/status signal frame, the Tx pin is driven high ('1') for at least one bit time before the next control/status signal frame can start.

To correctly identify the control/status signal frame received at the Rx pin, the receiving channel looks for the first high-to-low transition 514 on the Rx pin. This high-to-low transition 514 marks the beginning of the start bits 506. As described above, the Tx pin is held high when idling, and the start bits include a '0' held for one bit time followed by a '1' held for one bit time. When the Tx pin is held low when idling, a low-to-high transition can mark the beginning of the start bits.

To determine whether each bit has been correctly received, a voting scheme can be implemented to set a minimum number of samples from the control/status signal frame that must be read correctly before determining that the entire bit is correct. For the example bit time set at four clock cycles, a 3-of-4 voting scheme can be implemented. Specifically, the receiving channel can take a total of 4 samples over the duration (e.g., 4 clock cycles) of each bit. In this scheme, at least 3 of the 4 samples should have the same value for the bit to be considered valid. The next 4 samples belong to the next bit, and so on. Thus, for the start bits 506, at least 3 of the 4 samples should have a value of '0' in the first bit and at least 3 of the 4 samples should have a value of '1' in the second bit.

Different voting schemes can be implemented, such as a majority voting scheme or greater than half voting scheme, or others that provide a degree of certainty that each bit has been correctly received. Also, the voting scheme can vary based on the frequency of the clock signal. In addition, for proper operation of the signaling protocol, the rise and fall delays visible on a given channel's Rx input should be less than one reference clock period.

Inter-Channel Ring Initialization

As described above, all channels connected in an inter-channel ring interface should sync to a start condition to initialize the inter-channel ring interface to operate the connected channels as an aggregated channel. However, channels in separate chips may come out of reset at different times. When an inter-channel ring interface is activated before all channels connected within the interface are out of reset, some channels may not be able to synchronize to a start condition. An initialization protocol can be used to ensure that all channels in the inter-channel ring interface are out of reset before the interface can start operation.

Figure 6:
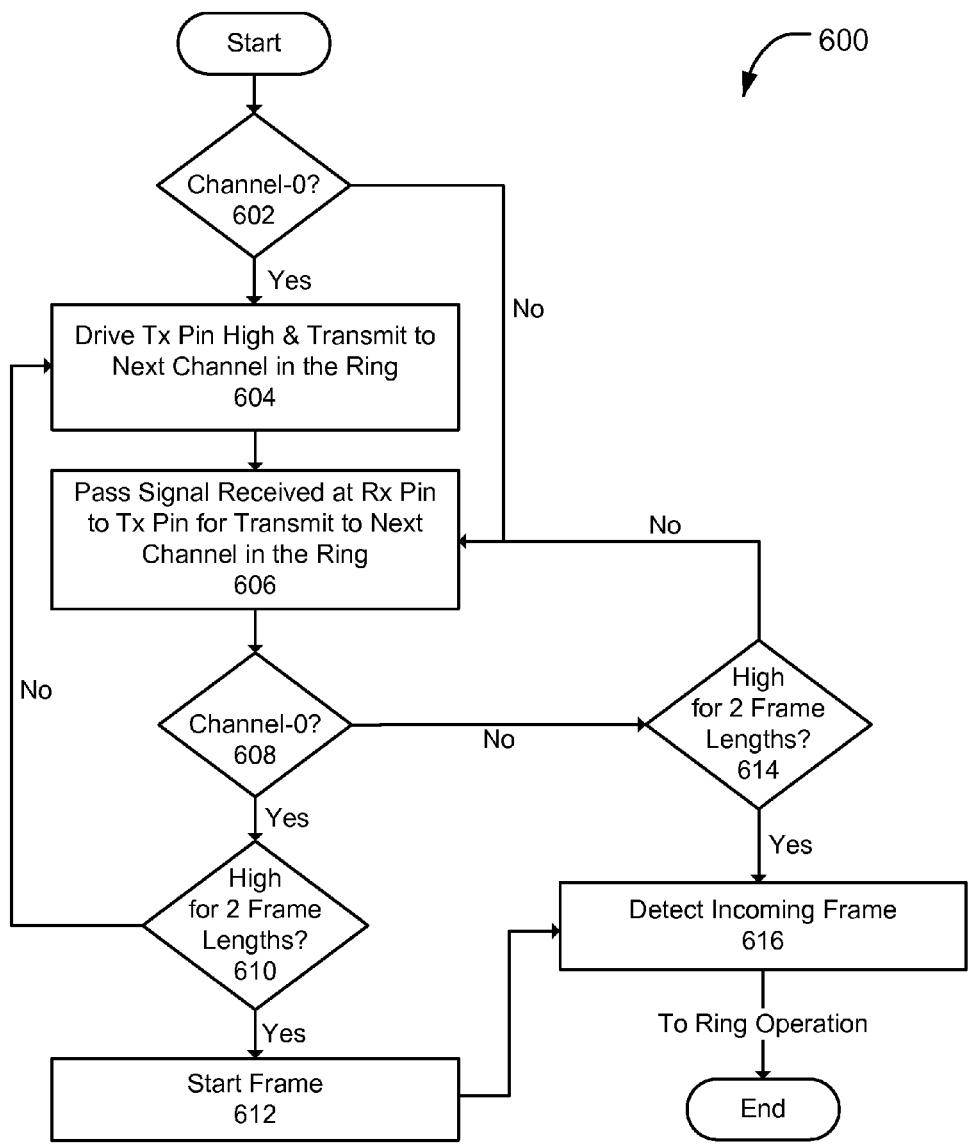
FIG. 6 is a process flow diagram showing an exemplary process for initializing an inter-channel ring interface.

FIG. 6 is an exemplary process flow diagram of a process 600 for initializing an inter-channel ring interface. The flop that drives a channel's transmit pin is reset low. In this way, every channel drives its Tx output low after reset. When channel assignment resolves to channel-0, for example (602), the Tx pin of channel-0 is driven high (604), indicating an idling ring. If the channel number resolves to a channel other than channel-0, that channel's Tx pin starts reflecting the data seen on the receive (Rx) pin (606). Thus, the received control/status signal frame at the Rx pin of the 'non-0' channel is simply passed to the Tx pin to be transmitted to the next channel in the inter-channel ring interface.

If the next channel in the ring is channel-0 (608), channel-0 waits to receive a '1' on its Rx input for the duration of two frame lengths (610) before initiating a control/status signal frame on the inter-channel ring interface (612). This ensures that all other channels connected by the inter-channel ring interface have returned from reset and are idling. All other channels connected by the inter-channel ring interface wait until their Rx pins are high for at least two frame lengths (614) before trying to detect an incoming control/status signal frame (616). Once the inter-channel ring is initialized, the channels connected by the inter-channel ring interface are ready to operate as a single aggregated channel.

As described above, the reset protocol can be used to propagate a reset operation over the inter-channel ring interface to a primary communication channel (e.g., channel-0) so that the inter-channel ring (e.g., all of the connected communication channels) synchronize themselves to a start condition without an external intervention from the station manager or a user, for example. Thus, the reset process in the inter-channel ring can be an self-synchronization process.

Inter-Channel Ring Operation

Figure 7:
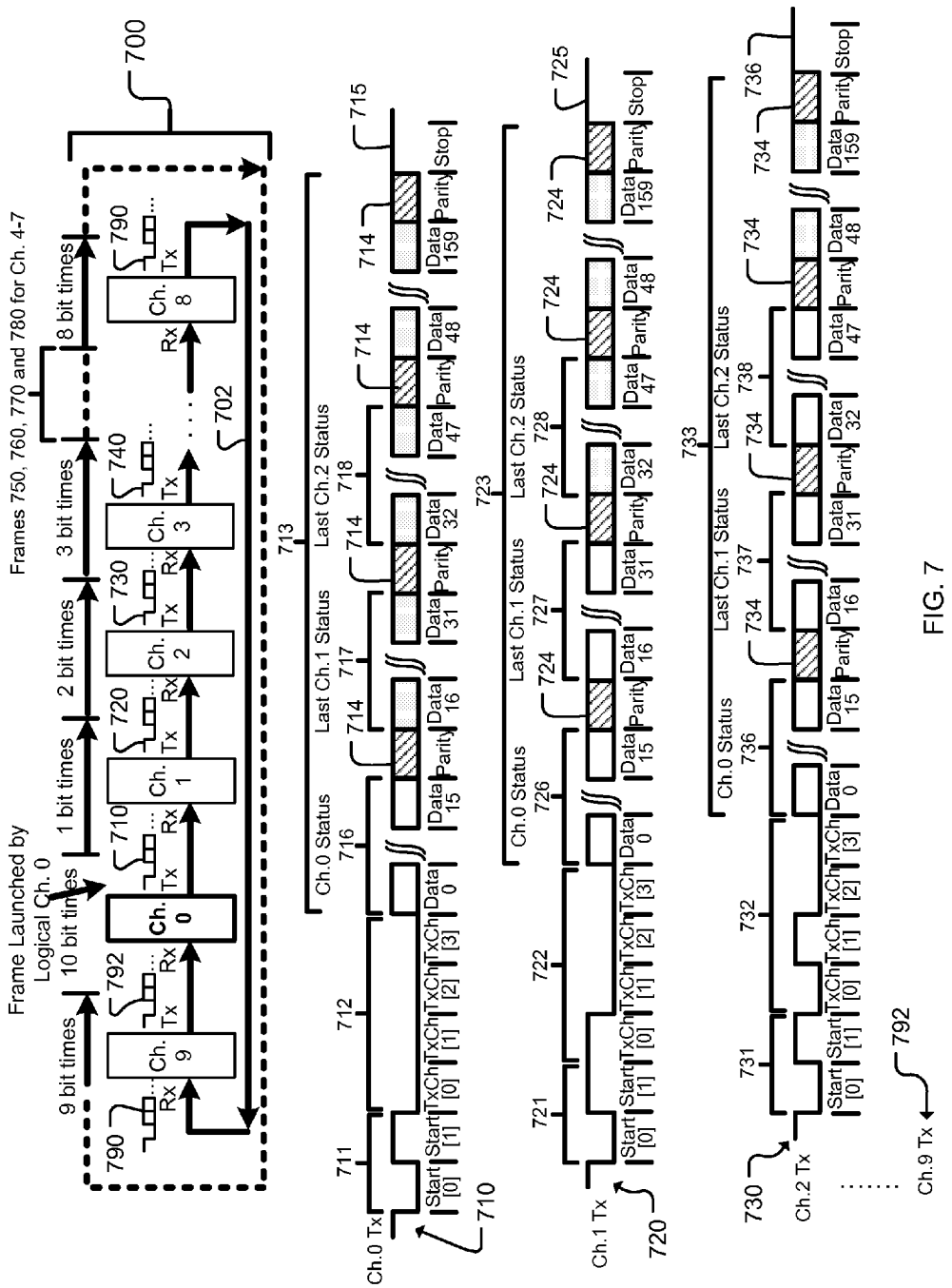
FIG. 7 is a block diagram showing an exemplary control/status signal frame timing diagram for operating an inter-channel ring interface that aggregates ten channels as a single 100 Gb channel.

FIG. 7 is a block diagram showing exemplary inter-channel ring interface operation 700. In the example shown in FIG. 7, a control/status signal frame 710 on an inter-channel ring interface 702 is initiated by a channel configured as 'channel-0.' The control/status signal frame transmitted by the Tx pin at remaining channels 1-9 is shown as control/status signal frames 720, 730, 740, 750, 760, 770, 780, 790 and 792 respectively, which are slightly modified instances of control/status signal frame 710. The control/status signal frame instances are labeled differently at different channel-to-channel interfaces to indicate the difference in the channel number that identifies the transmitting channel. As the control/status signal frame travels channel-to-channel over the inter-channel ring interface 702, e.g. as control/status signal frame instances 710, 720, 730, 740, 750, 760, 770, 780, 790 and 792, each channel can update its status with current information by writing to an assigned cell (e.g., a 16 bit data segment assigned to each channel). The current information is read from the local register corresponding to the channel. In addition to updating its own cell, each channel can replace any indeterminate information detected in the remainder of the control/status signal frame when indeterminate data or other errors are detected. Error handling process is described further below. Thus, each channel can update not only its own status, but also status of other channels if an error has or may have occurred. The status information for one or more other channels is updated using information from the immediately preceding control/status signal frame that is stored in the channel's global register. The status information for all channels can be stored in global registers (e.g., global registers 216, 226, 236 and 246 as shown in FIG. 2), and the local channel status information can be stored in local registers (e.g., local registers 218, 228, 238 and 248 as shown in FIG. 2.) Due to space limitations, global and local registers are not shown in FIG. 7, but channels 0-9 shown in FIG. 7 can be implemented to be substantially similar to channels 210, 220, 230 and 240 of FIG. 2 in structure and functionality.

In this example, all channels are substantially identical in structure and functionality, any of the channels, whether on the same chip or on different chips, can be assigned to function as 'channel-0.' This channel assignment can be made by a station manager (e.g., station manage 150) by sending a control/status signal frame through a management bus (e.g., management bus 270) at reset. Once the first start bit is sampled by channel-1, it can start transmitting to channel-2 and so on until the control/status signal frames 710, 720, 730, 740, 750, 760, 770, 780, 790 and 792 circulate all the way around the inter-channel ring interface 702 and back to channel-0. The information included in the control/status signal frames 710, 720, 730, 740, 750, 760, 770, 780, 790 and 792 can include auto-negotiation status and link status, for example. Other channel control and status information used in various standards, such as IEEE 802.3x, may be included in addition to or in place of any of the above information. In implementations, the format of the control/status signal frames 710, 720, 730, 740, 750, 760, 770, 780, 790 and 792 can vary depending on the communications standards supported by the PHY device.

The overall latency of transmission through the inter-channel ring interface 702 can be represented as the number of bit times it takes for a bit to travel from the Tx output of a given channel, through the inter-channel ring and back to the Rx input of the same channel. For the example shown in FIG. 7, the best case latency=Number of channels in the ring−1. This latency may be somewhat larger, depending on the implementation due to extra pipeline stages within the channels.

Each channel is assigned a programmable number of cells in a control/status signal frame. For the 100 Gb example shown in FIG. 7, channel-0 can be assigned from 1 to 3 cells, while channels 1 through 9 can be assigned 1 or 2 cells. The default setting for channel-0 can be 2 cells and for other channels, the default can be 1 cell. This allows the inter-channel ring interface to start operation after reset to allow auto-negotiation. The number of cells assigned per channel can be programmed to balance the tradeoffs between bit capacity and ring latency.

For illustrative purposes and due to space limitations, only the control/status signal frames transmitted from the Tx pin of channels 0-2 are shown. The structure and functionalities of the control/status signal frames transmitted by remaining channels are similar and can be derived from description of channels 0-2. For example, the control/status signal frame 710 transmitted from the Tx pin of channel-0 includes two start bits 711, a channel number 712, 'n' number of data bits 713 separated every 16 bits by a parity bit 714, and a stop bit 715. The 'n' number of data bits, e.g. data bits 713, are separated into cells (each cell including 16 bits separated by a parity bit 714), and the cells are assigned to the channels in the inter-channel ring interface. FIG. 7 shows data bits 0-15 (716) assigned to carry channel-0 status information, data bits 16-31 (717) assigned to carry channel-1 status information, and data bits 32-47 (718) assigned to carry channel-2 status information. While not shown in FIG. 7 due to space limitations, the remaining channels 3-9 can be assigned data bits 48-63, 64-79, 80-95, 96-111, 112-127, 128-143, and 144-159, respectively.

The start bits 711 for control/status signal frame 710 transmitted from the Tx pin of channel-0 include a '0' for a bit time (e.g., 4 clock cycles) followed by a '1' for a bit time (e.g., 4 clock cycles). The start bits 711 are followed by the channel number 712 shown as '0000' to identify channel-0 as the channel transmitting the control/status signal frame 710. Channel-0 starts off by inserting its own current (up-to-date) status in its one or more cells (e.g., cell 716), and the last known status of other remaining channels (e.g., channels 1-9) in cells belonging to the other channels. Thus, at this point, only the status information for channel-0 stored in cell 716 is current and the remaining cells include the previously known information for the other channels in the ring. As the control/status signal frame traverses through the inter-channel ring interface, e.g. as control/status signal frame instances 710, 720, 730, 740, 750, 760, 770, 780, 790 and 792, each channel inserts its most up to date status in its one or more cells, while replicating the other bits from Rx to Tx.

When the Rx pin of channel-1 receives the control/status signal frame 710 as described above, channel-1 reads the 'start condition' that includes the start bits 711 and the channel number 712 to determine whether the 'start condition' is correct. Channel-1 starts transmitting as soon as its Rx pin receives a good first bit ('0' in 3 of 4 clock cycles) of the start condition. In the example shown in FIG. 7, the start bits 711 are shown to be correct (a '0' for a bit time followed by a '1' for a bit time), and the channel number 712 correctly identifies channel-0 (a binary '0000') as the channel that transmitted the control/status signal frame 710. Detecting that the 'start condition' is correct, channel-1 updates its status in cell 717 and replicates the other bits (e.g., merely passes the remaining bits in the control/status signal frame.)

When an error is detected in any of the rest of the start condition bits, channel-1 resets and goes into a repeater mode where the channel merely passes the control/status signal frame received at the Rx pin. An error in the start condition can be either an incorrect bit (e.g., a '0' rather than a '1' or a '1' rather than a '0') or an indeterminate bit (fails the 3 of 4 samples voting scheme).

The control/status signal frame 720 transmitted from channel-1 is now a modified instance of control/status signal frame 710 received from channel-0 that includes correct start bits 721 (a '0' for a bit time followed by a '1' for a bit time) and a correct channel number 722 (this time, channel-1 indicated as '0001'). The 'n' data bits 723 include the updated status information for channel-0 at cell 726 and the updated information for channel-1 at cell 727. The status information for channel-2 at cell 728 includes the previously known status of channel-2 as inserted by channel-0. The remaining data bits also include the previously known status information for the remaining channels 3-9. Each cell is separated by a parity bit 724 and the control/status signal frame ends with a stop bit 725.

When the Rx pin of channel-2 receives the control/status signal frame 720 as described above, channel-2 reads the 'start condition' that includes the start bits 721 and the channel number 722 to determine whether the 'start condition' is correct. Channel-2 starts transmitting as soon as its Rx pin receives a good first bit ('0' in 3 of 4 clock cycles) of the start condition. In the example shown in FIG. 7, the start bits 721 are shown to be correct (a '0' for a bit time followed by a '1' for a bit time), and the channel number correctly identifies channel-1 (a binary '0001') as the channel that transmitted the control/status signal frame 720. Detecting that the 'start condition' is correct, channel-2 updates its status in cell 728 and replicates the other bits (e.g., merely passes the remaining bits in the control/status signal frame.)

In the case where an error is detected in any of the rest of the start condition bits, channel-2 resets and goes into a repeater mode where the channel merely passes the control/status signal frame received at the Rx pin. An error in the start condition can be either an incorrect bit (e.g., a '0' rather than a '1' or a '1' rather than a '0') or an indeterminate bit (fails the 3 of 4 samples voting scheme).

The control/status signal frame 730 transmitted from channel-2 is now a modified instance of control/status signal frame 720 received from channel-1 that includes correct start bits 731 (a '0' for a bit time followed by a '1' for a bit time) and a correct channel number 732 (this time, channel-2 indicated as '0010.') The 'n' data bits 733 include the updated status information for channel-0 at cell 736, the updated information for channel-1 at cell 737, and the updated status information for channel-2 at cell 738. The remaining data bits include the previously known status information for the remaining channels 3-9. Each cell is separated by a parity bit 734 and the control/status signal frame ends with a stop bit 735.

Transmission of the control/status signal frame from an Rx pin of a given channel to a Tx pin of a neighboring channel continues until the Rx pin of channel-0 receives control/status signal frame 792 from channel 9 that includes the updated status information for all channels. To continue the example shown in FIG. 7, when the Rx pin of channel-3 receives control/status signal frame 730 from channel-2, channel-3 determines whether the 'start condition' is correct as described above. Channel-3 starts transmitting as soon as its Rx pin receives a good first bit ('0' in 3 of 4 clock cycles) of the start condition. The start bits are the same (a '0' for a bit time followed by a '1' for a bit time) for all instances of the control/status signal frame, but the channel number is now channel-2 indicated as '0010.' After confirming the 'start condition,' channel 3 updates its status information at the cell assigned to channel 3 (e.g., data bits 48-63) and replicates all other data bits. At this point, the status information for channels 0-3 are updated and remaining channels status information include previously known information to be updated. This process continues, with each channel revising the control/status signal frame to reflect its identity as the transmitting channel and its updated status information. Once the control/status signal frame has traversed the ring, channel-0 receives the control/status signal frame 792. Channel-0 confirms that the 'start condition' is correct, including the channel number that identifies channel-9 as the transmitting channel. Once confirmed, channel-0 reports the updated status information to a station manager (e.g., station manager 150) through a management bus (e.g., management bus 270) indicating proper operation of the aggregated channels as a single channel. For the example shown in FIG. 7, the aggregated channel is configured as a 100 Gb channel.

Figure 8A:
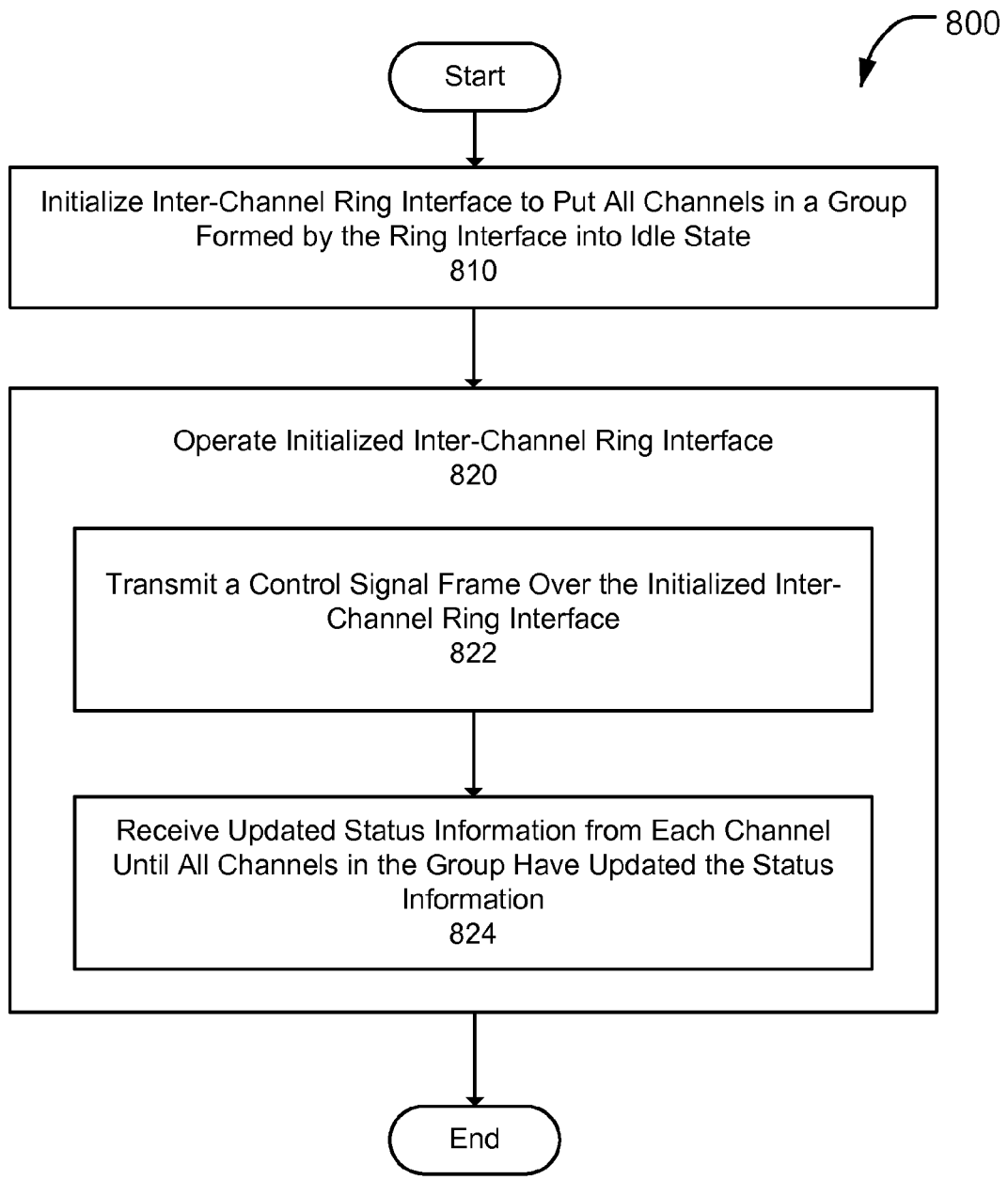
FIG. 8A is an exemplary process flow diagram for aggregating channels in a PHY device using an inter-channel ring interface.

FIG. 8A is a process flow diagram of an exemplary process 800 for operating an inter-channel ring interface in a PHY device. The process 800 summarizes the above described process of operating the inter-channel ring interface. Specifically, an inter-channel ring interface is initialized (810). The inter-channel ring interface physically connects two or more of the multiple channels in the PHY device using a ring configuration to form a group of channels that can operate as a single channel. To initialize the inter-channel ring interface, an initialization protocol can be applied to all channels in the group, forcing all channels in the group into an idle state. In addition, the process of initializing the inter-channel ring can be substantially as described with respect to FIG. 6.

The initialized inter-channel ring interface is used to operate the group of channels as a single channel (820). In order to operate the group of channels as a single channel, a control/status signal frame containing control and status information for the channels in the group is transmitted over the initialized inter-channel ring interface (822). Transmission of the control/status signal frame can be started from one of the channels in the group assigned as an initiating channel (e.g., 'channel-0'). Further, updated status information can be received from each channel in the group as the control/status signal frame traverses the ring (824). The updated information is inserted into the control/status signal frame by each corresponding channel as the channel processes the control/status signal frame. The control/status signal frame travels from one channel to another through the ring, receiving the updated status information until all channels in the group have updated the status information and the control/status signal frame returns to the initiating channel in the group.

Error Detection at Data Bits (Status Information) and Control Bits

Figure 8B:
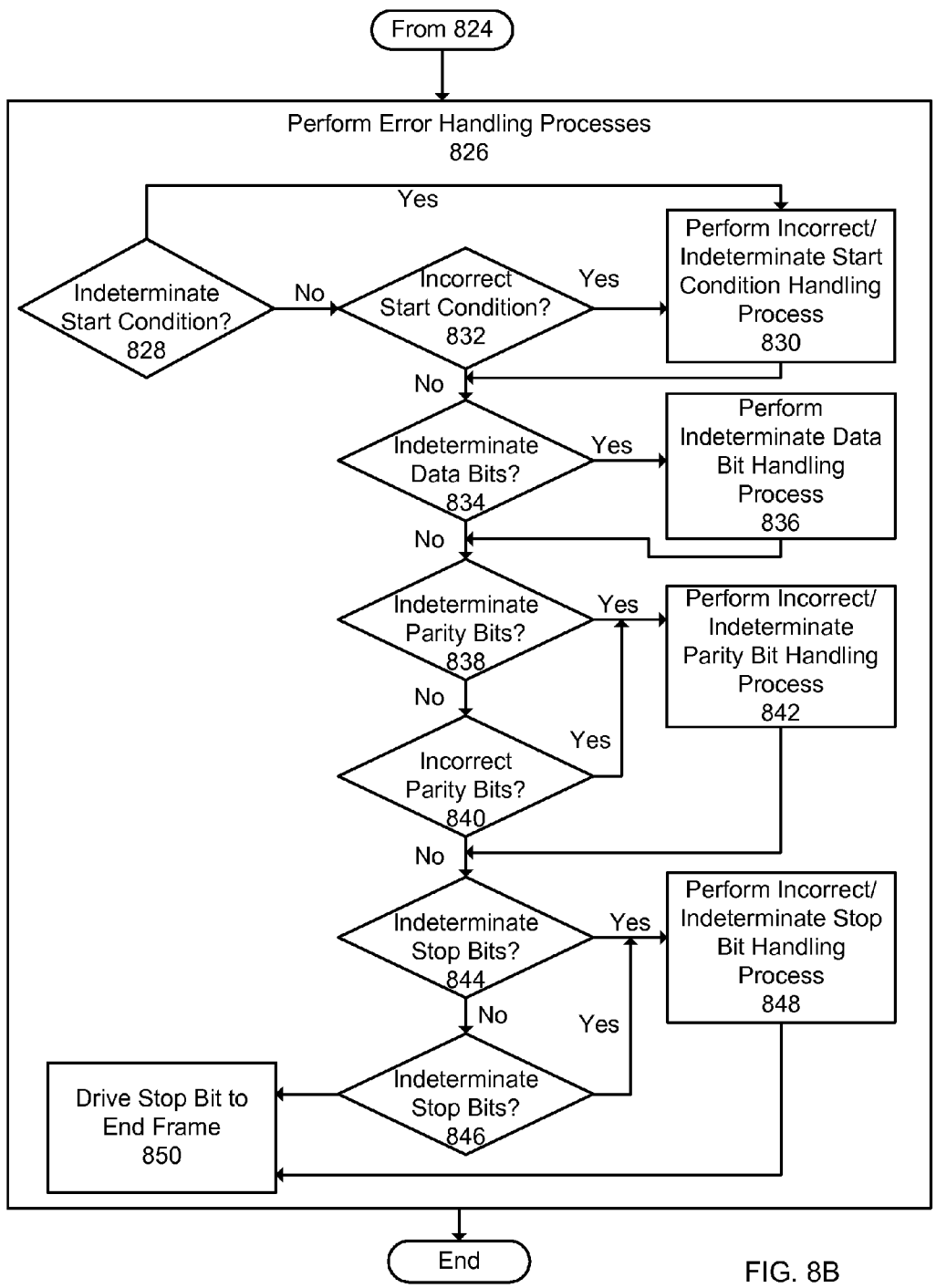
FIG. 8B is an exemplary process flow diagram for operating an initialized inter-channel ring interface to perform error handling processes.

For proper operation of the inter-channel ring interface, various error handling processes can be implemented. FIG. 8B is a process flow diagram of an exemplary process (820) for operating an initialized inter-channel ring, including error handling processes (826). As described with respect to FIG. 8A, the process of operating an initialized inter-channel ring interface (820) includes transmitting the control/status signal frame over the inter-channel ring interface (822) and receiving updated status information from each channel in the ring as the control/status signal frame is processed by each channel (824). In addition, as the control/status signal frame is received at the Rx pin of a channel, one or more error handling processes (826) can be performed. An error can occur in either or both of the control bits of the control/status signal frame and the data bits of the control/status signal frame. The error detection and handling processes for resolving errors in the control and data bits are described below in the order in which the bits appear in the control/status signal frame. As described above, the control/status signal frame includes from start to end: start bits, channel number bits, data bits segmented into cells by parity bits, and a stop bit. Although described sequentially, the error detection and handling processes can be performed in any order and two or more of the error detection and handling processes can be performed in parallel.

The receiving channel can detect errors (or faults) in the control bits of the control/status signal frame that include the start condition, e.g., the start bits and the channel number. Errors in the start condition can be categorized as indeterminate bit errors or incorrect bit errors. For detecting indeterminate bits, each channel can implement a bit error detection scheme to determine a stable bit value of each bit received at the Rx pin. For example, as described above, a 3-of-4 (samples or clock cycles) voting scheme can be used to filter out a glitch of less than or equal to one reference clock period, or marginal timing at either the leading or trailing edge of a bit. Thus, the value of a bit can be definitively determined even when an error of approximately one clock cycle arises. However, if more than one sample out of four is corrupted, the correct value of the bit cannot be determined. When the receiving channel detects at its Rx pin, an indeterminate bit in the start condition (828-Yes), the receiving channel can perform indeterminate/incorrect start condition handling process (830). Details of the indeterminate/incorrect start condition handling process (830) are described with respect to FIG. 8C below.

When an indeterminate bit is not detected in the start condition (828—No), the receiving channel can determine whether an incorrect bit is present. The receiving channel detects an incorrect bit in the start condition when the receiving channel is expecting a '0' but a '1' is detected or vice versa. While the bit may be incorrect, the value of the incorrect bit is accurately detected as either a '0' or a '1' based on the 3-of-4 samples voting scheme. In the exemplary implementation, the start bits are expected to be a '0' followed by a '1.' An incorrect bit is detected in the start bits when the receiving channel detects a '1' followed by a '0,' a '0' followed by a '0,' or a '1' followed by a '1.' With respect to the channel number, the receiving channel detects an incorrect bit error when the wrong channel number is detected. For example, channel-1 is expecting to receive a control/status signal frame from channel-0, and thus an incorrect bit error in the channel number is detected when the received channel number is anything other than the number assigned to channel-0. When an incorrect bit error is detected in the start condition (832), the receiving channel can perform the indeterminate/incorrect start condition handling process (830). Thus, the same error handling process can be performed for both indeterminate and incorrect bit errors.

The receiving channel can detect indeterminate bit errors in the data bits that include status information for all channels in the ring (834). The data bits are located after the channel number and are organized as multiple cells, with a parity bit separating adjacent cells. As described above, the value of each bit in the data bits can be determined using the 3-of-4 samples voting scheme. When an indeterminate bit error is detected in the data bits (834-Yes), the receiving channel can perform the indeterminate data bit handling process (836). Details of the indeterminate data bit handling process (836) are further described with respect to FIG. 8D.

The receiving channel can also detect errors in the parity bit that follows each cell. Both indeterminate parity bit errors (838) and incorrect parity bit errors (840) can arise. When an indeterminate or incorrect bit error is detected in a parity bit (838-Yes, 840-Yes), the receiving channel can perform the indeterminate/incorrect parity bit handling process (842). The details of performing indeterminate/incorrect parity bit handling process (842) are described with respect to FIG. 8E.

The receiving channel can also detect an error in the stop bit, which can be either an indeterminate stop bit error or an incorrect stop bit error. When either of these stop bit errors is detected (844-Yes, 846-Yes), the receiving channel can perform the indeterminate/incorrect stop bit handling process (848).

When no errors are detected in the received control/status signal frame, the receiving channel can drive the stop bit to end the control/status signal frame and wait for the next control/status signal frame (850).

For the errors described in FIG. 8B, the following describes the corresponding error handling process that the receiving channel performs responsive to the detected error type.

Indeterminate/Incorrect Start Condition Handling Process

Figure 8C:
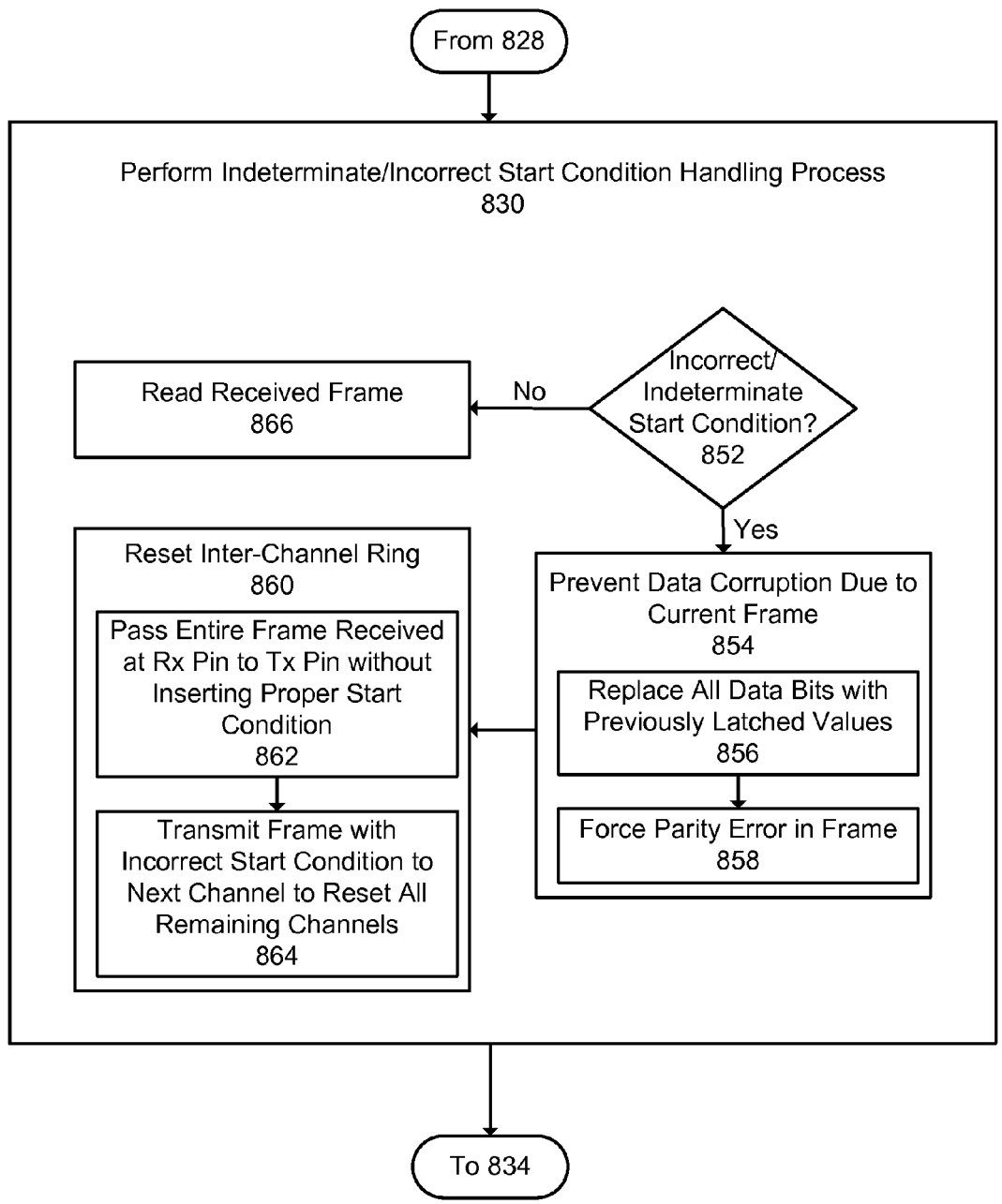
FIG. 8C is an exemplary process flow diagram for performing error handling processes that includes indeterminate/incorrect start condition handling process.

FIG. 8C is an exemplary process flow diagram for performing an error handling process that includes the indeterminate/incorrect start condition handling process 830. As described above, a valid start of a control/status signal frame is determined by the presence of a 'start condition.' The start condition includes start bits followed by a channel number that identifies the channel transmitting the control/status signal frame. The start bits (start [0:1] bits) include a '0' held for one bit time (e.g., four clock cycles or samples) followed by a '1' also held for one bit time. The channel number can include a field indicating the transmitting channel, which can include a binary number representation of the channel number assigned to the transmitting channel. Errors in detecting a valid start condition can include detection of an invalid start bit (e.g., 3-of-4 voting fails on at least one of the two start bits) or an invalid channel number. An invalid channel number can be received from a resetting channel. For example, upon reset, the transmitting channel passes the information received at the Rx pin to the Tx pin without updating the data contained in its own cell and without transmitting its own channel number.

When an indeterminate and/or incorrect bit is detected in any part of the start condition (852-Yes), the receiving channel performs at least two actions. First, the receiving channel prevents the current control/status signal frame from causing any data corruption (854). Because the receiving channel starts transmitting to the next channel in the ring before the entire start condition (i.e., the start bits and the channel number) is received from the previous channel, the receiving channel already may have transmitted at least a portion of the correct start condition to the next channel before the error is detected. To avoid propagating the error to the other channels in the ring, the receiving channel forwards the control/status signal frame without updating the channel number, followed by the previously latched values for all data bits in the control/status signal frame (856). The data bits arriving in the corrupted control/status signal frame are ignored and the global registers are not updated. In addition, the receiving channel forces a parity error in all outgoing cells of the control/status signal frame to prevent downstream channels from updating their global registers (858). As each subsequent channel receives the corrupted control/status signal frame, the incorrect channel number and the parity errors in the control/status signal frame are detected and all data bits in the corrupted control/status signal frame are ignored.

Next, the ring is reset (860). When an error occurs during the detection of the start condition, the channels may continue to stay out of synchronization if an incorrect bit (e.g., a bit for which the 3-of-4 voting scheme fails) in the control/status signal frame is consistently detected as one of the start bits. To force the channels in the ring to resynchronize, a channel's Rx and Tx state machines are set to the RESET state after transmission of the corrupted control/status signal frame is completed, as described above. As a result, each channel will enter RESET as the corrupted control/status signal frame propagates through the ring.

A channel in RESET is configured to pass along bits received at its Rx pin to its Tx pin (862). Because the channel passes the entire control/status signal frame without inserting a correct start condition, the next channel in the ring detects an incorrect transmitting channel number in the next instance of the control/status signal frame, determines that the control/status signal frame contains an error in the start condition, and places itself in the RESET state (864). This process continues until all channels enter RESET. When channel-0 enters RESET, channel-0 drives the Tx pin high to put the ring in idle for a predetermined period, such as twice the control/status signal frame length, and allows all channels to resynchronize to the correct start of the control/status signal frame using the initialization protocol described above. By resetting channel-0, which is the primary channel in the ring, all of the secondary channels also are able to resynchronize. When a valid start condition is detected, the receiving channel once again reads the received control/status signal frame (866).

Indeterminate Data Bits (Status Information) Handling Process

Figure 8D:
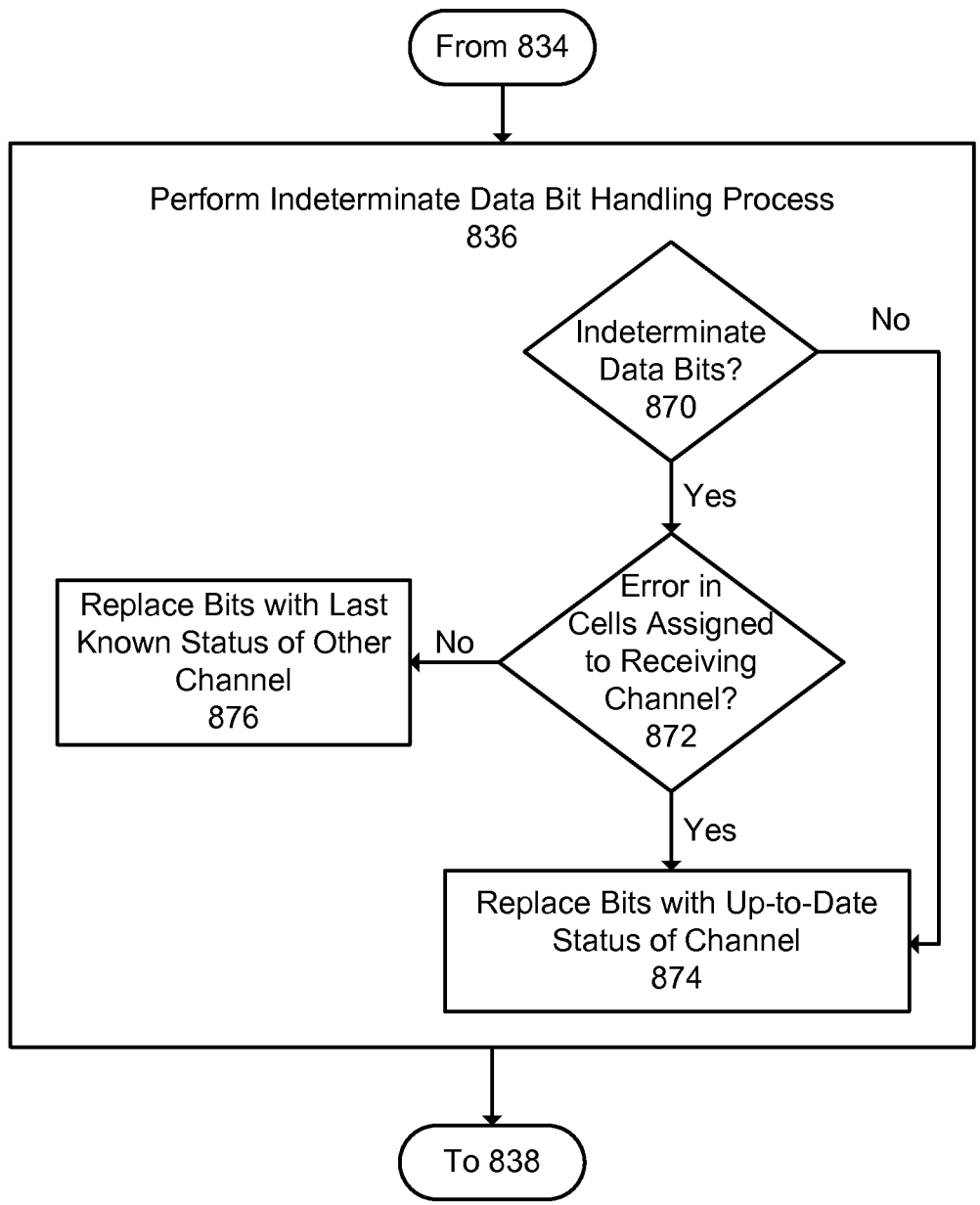
FIG. 8D is an exemplary process flow diagram for performing error handling processes that includes performing indeterminate/incorrect data bit error handling process.

FIG. 8D is an exemplary process flow diagram showing an exemplary process for performing an error handling process that includes the indeterminate data bit handling process (836). The receiving channel determines whether any of the received data bits are indeterminate (e.g., fails the 3-of-4 samples voting scheme) (870). When an indeterminate bit is detected in a data bit position (e.g., one or more cells) of the control/status signal frame assigned to the receiving channel (872-Yes), the receiving channel updates the indeterminate data bit with the most up to date value for transmission on its Tx pin (874). Even when no errors are detected in the data bits (e.g., cell or cells) assigned to the receiving channel (870—No), the channel updates the data bits with the most up-to-date status information (874). Thus, whether the status information is out of date or the data bits are indeterminate, each channel inserts its updated status information into its assigned cell(s) for transmission. The receiving channel's most up-to-date status can be stored in and retrieved from one or more local registers (e.g., local registers 218, 228, 238 and 248.)

When an indeterminate bit is detected at a data bit position assigned to another channel in the ring (872—No), the last known status information corresponding to that bit is inserted into the data bit position for transmission (876). The last known value representing the status of the other channel can be stored in one or more global registers (e.g., global registers 216, 226, 236 and 246). This data bit position affected by the replacement will be updated with the most up-to-date information by the channel assigned to the data bit position when it next receives the control/status signal frame.

Indeterminate/Incorrect Parity Bit Handling Process

Figure 8E:
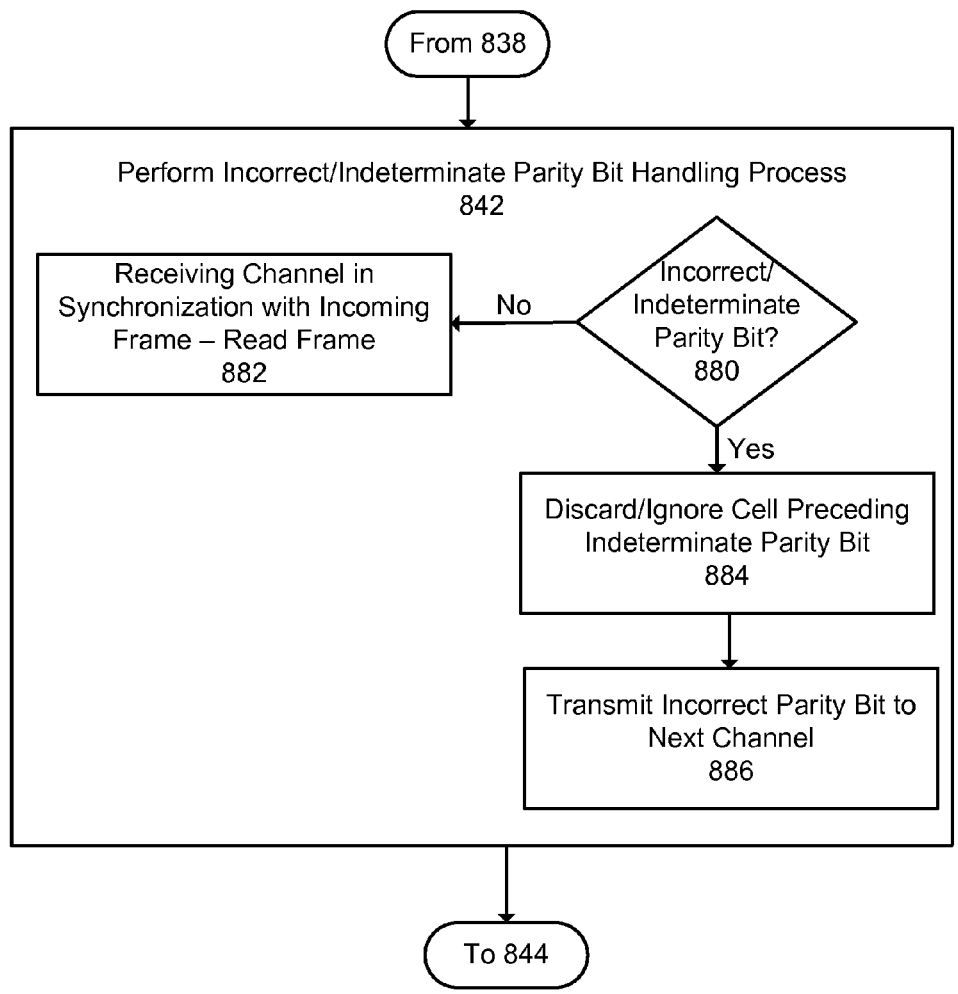
FIG. 8E is an exemplary process flow diagram of a process for performing error handling processes that includes performing incorrect/indeterminate parity bit handling process.

FIG. 8E is an exemplary process flow diagram of a process for performing an error handling process that includes performing the incorrect/indeterminate parity bit handling process (842). As described above, a parity bit is included after each cell, e.g., one parity bit is included after every 16 data bits. When a parity bit is determined to be correct (880—No), the receiving channel is in synchronization with the incoming control/status signal frame (882) and the received control/status signal frame can be read and updated. When the parity bit is either indeterminate or incorrect, the channel either is not in synchronization with the control/status signal frame, or the previous channel is indicating an error in the preceding cell (e.g., 16 data bits preceding the parity bit). When an indeterminate or incorrect parity bit is detected (880-Yes), the corresponding data bits, e.g., the 16 bits preceding the parity bit, are ignored by the receiving channel and the status information corresponding to the ignored data bits is not updated (884). Further, because the receiving channel starts transmission of its instance of the control/status signal frame before the entire control/status signal frame is received, one or more corrupted bits preceding the incorrect parity bit already may have been transmitted downstream to the next channel in the ring. Thus, the receiving channel also transmits an incorrect parity bit to instruct to the downstream channels to ignore these corrupted bits (886).

Indeterminate/Incorrect Stop Bit Handling Process

Figure 8F:
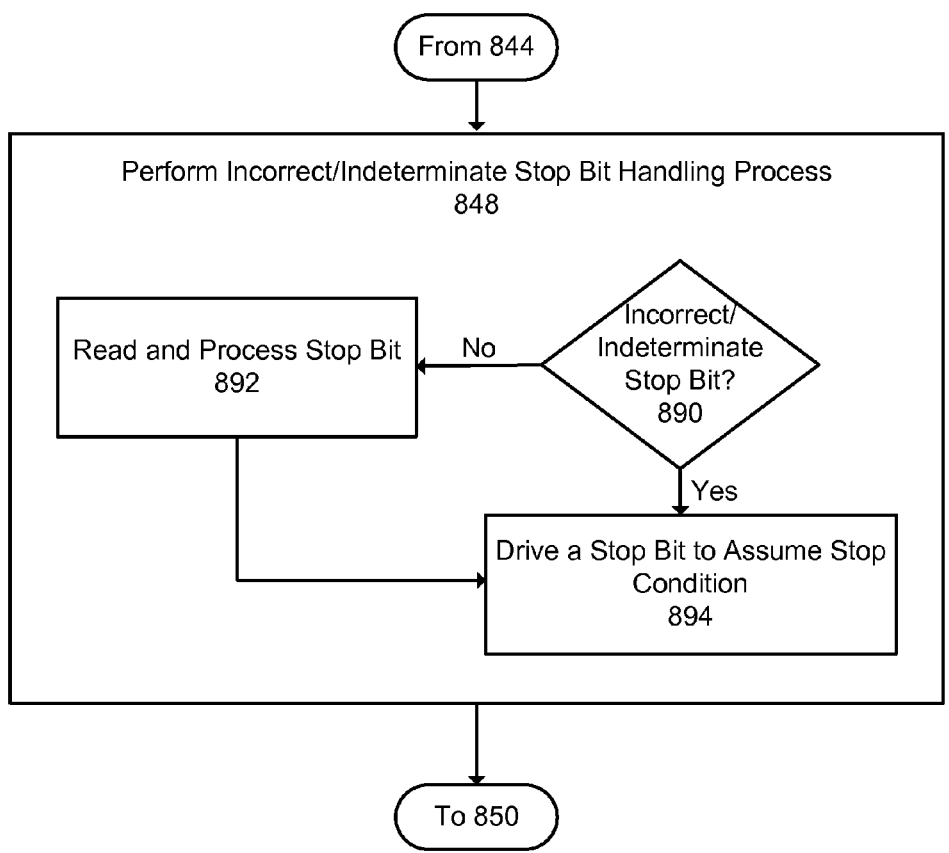
FIG. 8F is an exemplary process flow diagram of performing error handling processes that includes performing incorrect/indeterminate stop bit handling process.

FIG. 8F is an exemplary process flow diagram for performing an error handling process including performing the incorrect/indeterminate stop bit handling process (848). The receiving channel can determine whether an incorrect/indeterminate stop bit has been detected (890). When the stop bit is correct (890—No), the detected stop bit is read and interpreted to signal the end of the control/status signal frame (892). When a stop bit expected by the receiving channel is indeterminate or incorrect (890-Yes), the receiving channel nonetheless assumes a stop condition (890). Thus, the receiving channel drives a stop bit after the $n^{th}$ data bit regardless of whether the input is correctly sampled as a stop bit.

The above described various error handling process can be performed individually or in combination as particular errors are detected.

Network Applications

Figure 9:
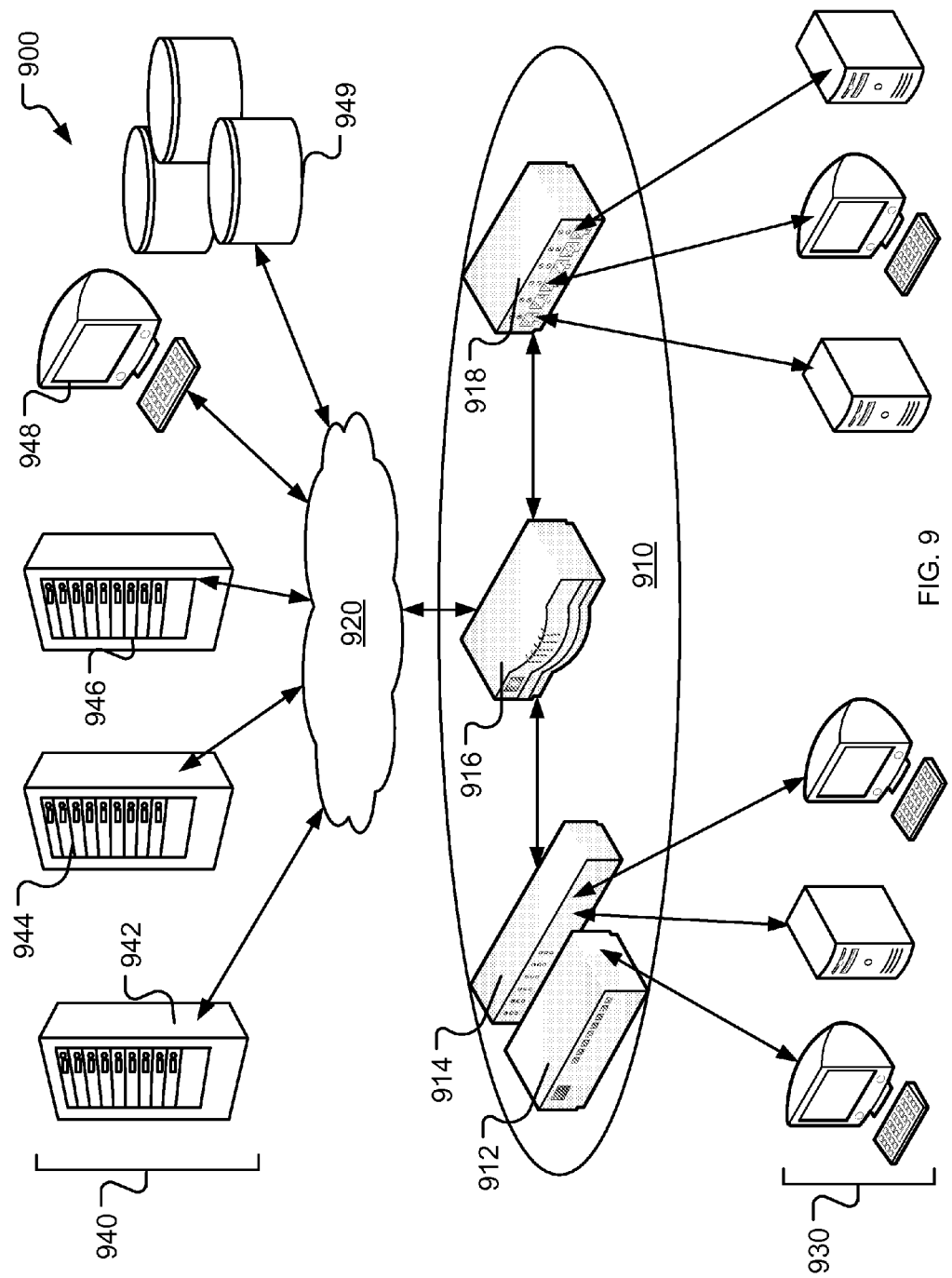
FIG. 9 is an exemplary block diagram of a network system for implementing a PHY device that aggregates channels using an inter-channel ring interface.

As described briefly with respect to FIG. 1 above, the PHY device and the associated inter-channel ring interface described in this specification can have various applications in network systems. FIG. 9 is a block diagram of an exemplary network system 900 in which the PHY device can be implemented. The network system 900 includes network devices 910 connecting various network nodes 930 and terminals 940. The network devices 910 can be implemented as bridges 912, switches 914, routers 916, hubs 918, or any other such devices. These network devices 910 can include one or more PHY devices to provide connections between a MAC layer and the physical medium. The PHY devices in the network devices 910 can be implemented to be substantially equivalent to the PHY devices 130, 132, 134, 136, 138, 200, 300 and 400 as described with respect to FIGS. 1-4 above.

The network devices 910 can be implemented to create a local area network (LAN) that provides multiple connections to multiple agent side network nodes or terminals 930, such as various user terminals. On the other side of a network 920, the network devices 910 can be connected to host side network nodes or terminals 940, which can include a number of servers 942, 944, 946 and 948 in addition to network storage devices 949. The host servers 942, 944, 946 and 948 can include various types of servers, such as different blade server platforms (e.g., UNIX, Windows, Linux, etc.) In addition, the host side servers 942, 944, 946 and 948 and the network storage devices 949 can be used to implement various networked storage systems, such as storage area network (SAN), network attached storage (NAS), etc.

For example, a data center can implement the describe PHY device in various network devices to provide a multipoint access to multiple network nodes or terminals. Moreover, the described PHY devices can be applied in other network systems where aggregation of channels can be used to selectively scale the network bandwidth.

The described techniques, apparatus and systems can be used to implement an inter-channel ring interface that combines multiple channels or lanes of a PHY under the OSI model to operate as a single channel having higher bandwidth, i.e., throughput. The described inter-channel ring interface is scalable to accommodate configurations of various throughputs (e.g., 10 gigabits per second (Gb), 20 Gb, 40 Gb, 100 Gb, etc.) and can combine channels across chip boundaries.

In one aspect, a communication device includes multiple channels configured to transmit data at respective first data throughputs. An inter-channel ring interface connects at least some of the multiple channels in a group to operate as a single channel at a second throughput.

The subject matter described in this specification can be implemented in various embodiments to potentially provide one or more of the following advantages. The described inter-channel ring interface can allow the channels connected by the interface to communicate with one another to share control and status information used to operate the combined channels as a single unit having a data throughput that is higher than each individual channel. The throughput of the combined channels can be substantially equal to the total throughput of the individual channels being combined. The described inter-channel ring interface can be implemented to combine multiple channels without using a preset central dedicated logic, such as a dedicated Physical Medium Dependent (PMD) sub-layer, to control and coordinate the combined channels. Eliminating the need for preset central dedicated logic can further permit reducing the number of wires needed to tightly integrate the logic across all channels, thereby avoiding wire explosion.

The described techniques, apparatus and systems can be implemented in various implementations to distribute the logic functionalities of the PMD sub-layer to the individual channels. Distributing the logic can promote scalability of the aggregated channels based on the connections provided by a given inter-channel ring interface configuration. For instance, because the described inter-channel ring interface can be applied to channels in different chips, the inter-channel ring interface can be scaled across chip boundaries (i.e., no physical limitations) to provide configurable data throughputs. In addition, by using a distributed logic architecture as described above, flexible channel numbering or assignment is possible in an aggregated PHY to support variations in customer board layout. For example, any channel in any chip of a PHY can be designated to operate as the primary channel (or 'channel-0') that performs configuration functions, such as auto-negotiation. Because any channel can be assigned to operate as 'channel-0,' channel numbering or assignment can be performed independent of the board layout.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described. Other implementations, enhancements and variations can be made based on what is described and illustrated in this application. For example, while the above implementations have been described in the context of 10 G, 40 G and 100 G IEEE 802.3 PHY's, the same communication techniques can be employed in other aggregate PHY architectures to enable scaling across chip boundaries.

What is claimed is:

1. A communication device, comprising:

communication channels configured to carry data at respective first data throughputs; and an inter-channel ring interface configured to connect at least two of the communication channels in a ring configuration to define an aggregated group of communication channels, wherein the aggregated group of communication channels is configured to operate as a single channel at a second data throughput, wherein each of the communication channels in the aggregated group of communication channels includes:

a control signal receiver configured to receive a control signal instructing the communication channel to operate as a part of the aggregated group of communication channels; and a control signal transmitter configured to transmit the control signal to one of the other communication channels in the aggregated group of communication channels, wherein the control signal comprises control and status information for all of the communication channels in the aggregated group of communication channels, and each of the communication channels in the aggregated group of communication channels is configured to update its own status information in the control signal.

2. The communication device of claim 1, wherein:

the inter-channel ring interface is configured to connect the aggregated group of communication channels in the ring configuration by connecting the control signal transmitter of one of the communication channels to the control signal receiver of a neighboring one of the communication channels.

3. The communication device of claim 1, wherein the communication channels in the aggregated group of channels operate as the single channel at the second data throughput in response to the inter-channel ring interface being active, and the communication channels operate as individual communication channels at the respective first data throughputs in response to the inter-channel ring interface being inactive.

4. The communication device of claim 1, wherein the second data throughput is a sum of the respective first data throughputs of the communication channels in the aggregated group of communication channels.

5. The communication device of claim 1, wherein each of the communication channels in the aggregated group of communication channels comprises:
- a global register for storing the status information corresponding to each of the communication channels in the aggregated group of communication channels; and
- a local register for storing its own status information.

6. The communication device of claim 1, wherein the control and status information comprises at least one of auto-negotiation status information and link status information.

7. The communication device of claim 1, wherein:
- the communication channels in the aggregated group of communication channels are disposed on at least two integrated circuit chips; and
- the inter-channel ring interface is configured to physically connect the communication channels in the aggregated group of communication channels across a chip boundary between the at least two integrated circuit chips.

8. The communication device of claim 1,
further comprising:
another inter-channel ring interface configured to connect at least two of the communication channels in another ring configuration to define another aggregated group of communication channels.

9. A method of controlling communication channels associated with a communication device, the method comprising:
- transmitting a control signal over an inter-channel ring interface that physically connects, in a ring configuration, communication channels associated with a communication device, wherein the control signal configures the connected communication channels to operate as a single channel;
- operating the connected communication channels to carry data as the single channel; and
- initializing the inter-channel ring interface by applying an initialization protocol to the connected communication channels to detect that the connected communication channels have reached an idle state.

10. The method of claim 9, wherein:
the control signal comprises control and status information associated with each of the connected communication channels.

11. The method of claim 10, further comprising:
inserting at a connected communication channel updated status information into the control signal.

12. The method of claim 10, further comprising:
detecting an error in at least one data bit of the control signal and initiating an error handling process.

13. The method of claim 12, further comprising:
updating, at a given connected communication channel, the status information associated with another connected communication channel in response to the error detected in the at least one data bit being associated with status information of the another communication channel.

14. The method of claim 12, wherein initiating the error handling process comprises:
passing, at a given connected communication channel, the control signal to a next connected communication channel and resetting the given connected communication channel.

15. The method of claim 12, wherein
detecting the error comprises:
detecting, at a given connected communication channel, an error in start bits of the control signal; and
initiating the error handling process comprises:
ignoring the status information; and
transmitting a control signal to a next connected communication channel with an incorrect parity bit inserted in the transmitted control signal.

16. A network system comprising:
a physical medium configured to receive data at multiple data throughputs comprising at least a first data throughput and a second data throughput;
a communication device configured to connect with the physical medium and support the multiple data throughputs for carrying the data through the communication device, wherein the communication device comprises:
communication channels, each configured to carry data at the first data throughput, and
an inter-channel ring interface configured to physically connect at least some of the communication channels in a ring configuration to define an aggregated group, wherein the aggregated group is configured to operate as a single channel at the second data throughput; and
a link layer device configured to receive the data from the communication device at the first data throughput or the second data throughput,
wherein the communication channels in the aggregated group defined by the inter-channel ring interface are disposed on multiple integrated circuit chips; and
wherein the inter-channel ring interface is configured to physically connect the communication channels in the aggregated group across a chip boundary between at least two of the multiple integrated circuit chips.

17. The communication device of claim 8, wherein the communication channels in the aggregated group of communication channels are different than the communication channels in the another aggregated group of communication channels.

18. The communication device of claim 8, wherein at least one of the communication channels in the aggregated group of communication channels is one of the communication channels in the another aggregated group of communication channels.

19. The communication device of claim 18, further comprising:
a selection device configured to instruct the at least one communication channel in both the aggregated group of communication channels and the another aggregated group of communication channels to operate in the aggregated group of communication channels in some instances and to operate in the another aggregated group of communication channels in other instances.

20. The communication device of claim 19, wherein the selection device is a multiplexer.

* * * * *